(12) United States Patent
Iwasaki

(10) Patent No.: US 8,483,555 B2
(45) Date of Patent: Jul. 9, 2013

(54) LENS BARREL

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 13/273,474

(22) Filed: Oct. 14, 2011

(65) Prior Publication Data

US 2012/0093495 A1 Apr. 19, 2012

(30) Foreign Application Priority Data

Oct. 14, 2010 (JP) ................................. 2010-231110

(51) Int. Cl.
*G03B 17/00* (2006.01)

(52) U.S. Cl.
USPC ................................. 396/72; 396/85; 359/699

(58) Field of Classification Search
USPC ............. 396/72, 85; 348/240.3; 359/699–700
See application file for complete search history.

(56) References Cited

U.S. PATENT DOCUMENTS

| | | | |
|---|---|---|---|
| 4,199,227 A | 4/1980 | Uesugi et al. | |
| 6,222,684 B1 * | 4/2001 | Nishimura | 359/740 |
| 6,853,499 B2 | 2/2005 | Iwasaki | |
| 7,839,579 B2 | 11/2010 | Iwasaki | |
| 7,852,578 B2 | 12/2010 | Iwasaki | |
| 7,855,746 B2 | 12/2010 | Iwasaki | |
| 7,864,241 B2 | 1/2011 | Iwasaki | |
| 7,872,683 B2 | 1/2011 | Iwasaki | |
| 7,876,508 B2 | 1/2011 | Iwasaki | |
| 2006/0024039 A1 * | 2/2006 | Nomura | 396/72 |
| 2009/0231731 A1 * | 9/2009 | Sasaki | 359/700 |
| 2010/0053780 A1 | 3/2010 | Iwasaki | |
| 2010/0103307 A1 | 4/2010 | Iwasaki | |
| 2010/0157440 A1 | 6/2010 | Iwasaki | |
| 2011/0102911 A1 | 5/2011 | Iwasaki | |
| 2011/0128634 A1 | 6/2011 | Iwasaki | |

FOREIGN PATENT DOCUMENTS

| | | |
|---|---|---|
| EP | 1 903 366 A2 | 3/2008 |
| JP | 61-609 | 1/1986 |
| JP | 2007-219121 | 8/2007 |
| JP | 2008-249982 | 10/2008 |
| JP | 2009-69290 | 4/2009 |
| JP | 4726754 | 4/2011 |

* cited by examiner

*Primary Examiner* — Christopher Mahoney
(74) *Attorney, Agent, or Firm* — Oblon, Spivak, McClelland, Maier & Neustadt, L.L.P.

(57) ABSTRACT

A lens barrel that reinforces a connecting part between a movable lens barrel and a fixed barrel, without requiring a new drive source, is disclosed. The lens barrel includes: a rotary barrel fitted in a fixed barrel; a cam mechanism for connecting the rotary barrel and the fixed barrel; and a ring member. The fixed barrel includes an engagement section and a rotary drive mechanism for revolving the ring member. The rotary drive mechanism locates the ring member to an engagement-enabling position when a connection by the cam mechanism reaches a predetermined position, directing the connection from a first end to a second end of an idle revolving area, the first end continuing to an advancement/retreat movement area; and to a release position, when the connection by the cam mechanism is located at the first end of the idle revolving area.

14 Claims, 11 Drawing Sheets

LENS BARREL

CROSS-REFERENCE TO THE RELATED APPLICATIONS

This application is based on and claims the priority benefit of Japanese Patent Application No. 2010-231110, filed on Oct. 14, 2010, the contents of which are incorporated herein by reference.

BACKGROUND OF THE INVENTION

1. Field of the Invention

The present invention relates to a lens barrel which is used with their lens groups collapsed in one mode, and with their lens groups extended to their predetermined positions in another mode.

2. Description of the Related Art

It has been strongly requested that image taking apparatuses such as digital still cameras and digital video cameras (hereinafter referred to as "digital cameras") have enhanced photographic performance and portability. Against this background, some image taking apparatuses have a configuration in which: while in a non-photographic state, at least a part of the lens groups is retracted from its photographic position on a photographic optical axis, and the lens groups are collapsed inside a camera main body with distances among the lens groups reduced to a level less than the minimum necessary distances required for image taking as much as possible; and while in a photographic state, these lens groups are extended from the inside of the camera main body such that distances among the lens groups become long enough for image taking. In such image taking apparatuses, holding frames for holding the respective lens groups, except the retractable lens, are held by multiple telescopic movable lens barrel which are configured to be movable in the direction of the photographic optical axis with respect to the fixed barrel portion of the camera main body; and the holding frames are accordingly collapsible into and extendable from the camera body. These image taking apparatuses are suitable to be carried, because the lengthwise dimension (hereinafter also referred to as a "thickness dimension") of the movable lens barrels in the direction of the photographic optical axis can be reduced by putting the lens barrel into the collapsed state.

However, these image taking apparatuses have a risk that a large load is caused on the connecting part between the movable lens barrels and the fixed barrel portion when an impact attributable to an external factor such as their fall or collision by other objects acts in the direction of optical axis of the movable lens barrels during a photographic state, that is to say, a state in which the movable lens barrels are extended.

Against this background, a lens barrel has been already known, in which: at least one of the retractable lens groups is held by a retractable lens holding frame configured to retract the retractable lens groups outside the inner diameter of the fixed barrel portion; and concurrently, the lens barrel is provided with a collision preventing piece for, when put into a photographic state, preventing the movable lens barrel from moving into the fixed barrel portion in the direction of the optical axis (see Japanese Patent Application Publication No. 2007-219121).

This collision preventing piece is made to move to a position in which the collision preventing piece comes into contact with the rear end surface of the movable lens barrel when the movable lens barrel is to be retracted toward the fixed barrel portion, because the collision preventing piece is made to advance toward the inside of the fixed barrel portion in conjunction with the advancement of the retractable lens holding frame from the outside of the fixed barrel portion onto the photographic optical axis. Thereby, the lens barrel makes it possible to inhibit the increase in an outer diameter of a fixed barrel portion without increasing the distances among the lens groups while collapsed, compared with the conventional configuration in which the lens groups are retracted to the inside of the fixed barrel portion. In addition, the lens barrel can prevent a large load from being caused on the connecting part between the movable lens barrel and the fixed barrel portion due to an impact produced by an external factor.

Nevertheless, the configuration of the above-mentioned conventional lens barrel is as follows. The collision preventing piece is designed to advance to the inside of the fixed barrel portion in conjunction with the advancement of the retractable lens holding frame from the outside of the fixed barrel portion onto the photographic optical axis. In addition, the collision preventing piece is configured to be retracted to the outside of the fixed barrel portion in conjunction with the retraction of the retractable lens holding frame from the photographic optical axis to the outside of the fixed barrel portion. This configuration is based on the prerequisite that the conventional lens barrel is provided with the retractable lens holding frame which moves in and out across the fixed barrel portion. This requires a drive source for the retractable frame in addition to the drive source for the movable lens barrel.

Furthermore, the above-mentioned conventional lens barrel makes it difficult to effectively reinforce an area corresponding to a location in which the connecting part between the movable lens barrel and the fixed barrel portion is provided, because the collision preventing piece restricts its set position to the vicinity of the retractable lens holding frame in the circumferential direction of the fixed barrel portion due to its use of the drive source for the retractable frame which is dedicated to the retractable lens holding frame.

SUMMARY OF THE INVENTION

The present invention has been made with the foregoing situation taken into consideration. An object of the present invention is to provide a lens barrel capable of appropriately reinforcing a connecting part between a movable lens barrel and a fixed barrel portion without requiring a new drive source.

A lens barrel according to an embodiment of the present invention for achieving the above object is a lens barrel including: a plurality of lens holding frames configured to respectively hold a plurality of lens groups in order that the lens groups be changed from a collapsed state to a photographic state by moving the at least some of the lens groups toward an object, the collapsed state being that in which the lens groups are stored with at least some of the plurality of lens groups collapsed; a movable lens barrel configured to hold the lens holding frames in its inside; and a fixed barrel portion configured to hold the movable lens barrel in its inside, the movable lens barrel including a rotary barrel fitted in the fixed barrel portion in a way that makes the rotary barrel movable in a direction of a photographic optical axis with respect to the fixed barrel portion, and revolvable around the photographic optical axis, the lens barrel including: a cam mechanism connecting the rotary barrel and the fixed barrel portion together and having an advancement/retreat movement area and an idle revolving area, the advancement/retreat movement area being configured to make the rotary barrel, which has been in the collapsed state, advance in the direction of the photographic optical axis in response to revolution of the rotary barrel with respect to the fixed barrel portion, the idle revolving area continuing to the advancement/retreat movement area, and the idle revolving area being configured to allow the rotary barrel to revolve with respect to the fixed barrel portion without moving the rotary barrel in the direction of the photographic optical axis while in the photographic state; and a ring member capable of revolving with respect to the fixed barrel portion, concurrently capable of moving in the direction of the photographic optical axis integrally with the rotary barrel, and shaped like a ring which enables the ring member to be accommodated in an inside of the fixed barrel portion. The ring member includes at least one protrusion which projects in a radial direction. The fixed barrel portion includes an engagement section and a rotary drive mechanism, the protrusion being capable of engaging with the engagement section in the direction of the photographic optical axis from near the object, the rotary drive mechanism being configured to make the ring member revolve with respect to the fixed barrel portion in response to the revolution of the rotary barrel with respect to the fixed barrel portion. The rotary drive mechanism makes the ring member assume its rotary posture with respect to the fixed barrel portion in an engagement-enabling position which makes the protrusion and the engagement section opposed to each other in the direction of the photographic optical axis with the protrusion being situated closer to the object, when the connection by the cam mechanism becomes situated in a predetermined position which directs the connection from a first end to a second end of the idle revolving area, the first end continuing to the advancement/retreat movement area. The rotary drive mechanism makes the ring member assume its rotary posture in a release position which releases the engagement section and the protrusion from their opposed state in the direction of the photographic optical axis, when the connection by the cam mechanism becomes situated in a location of the first end of the idle revolving area. The rotary drive mechanism makes the ring member keep its rotary posture in the engagement-enabling position, when the connection by the cam mechanism becomes situated in a position between the predetermined position and the second end.

BRIEF DESCRIPTION OF THE DRAWINGS

FIG. 11A shows their maximum extended positions as shown in FIG. 8. FIG. 11B shows how the first rotary barrel is made to revolve for its retraction until the first rotary barrel takes a predetermined posture, starting with the state shown in FIG. 11A. FIG. 11C shows a position at which the first rotary barrel starts to be retracted. FIG. 11D shows how the first rotary barrel is made to revolve for its retraction until the first rotary barrel takes another predetermined posture, starting with the state shown in FIG. 11C. FIG. 11E shows a retracted position.

FIG. 12A shows a state in which a photographic lens assembly is retracted and stored in a body of a camera. FIG. 12B shows a state in which the photographic lens assembly projects out of the body of the camera.

DETAILED DESCRIPTION OF THE PREFERRED EMBODIMENTS

Figure 1:
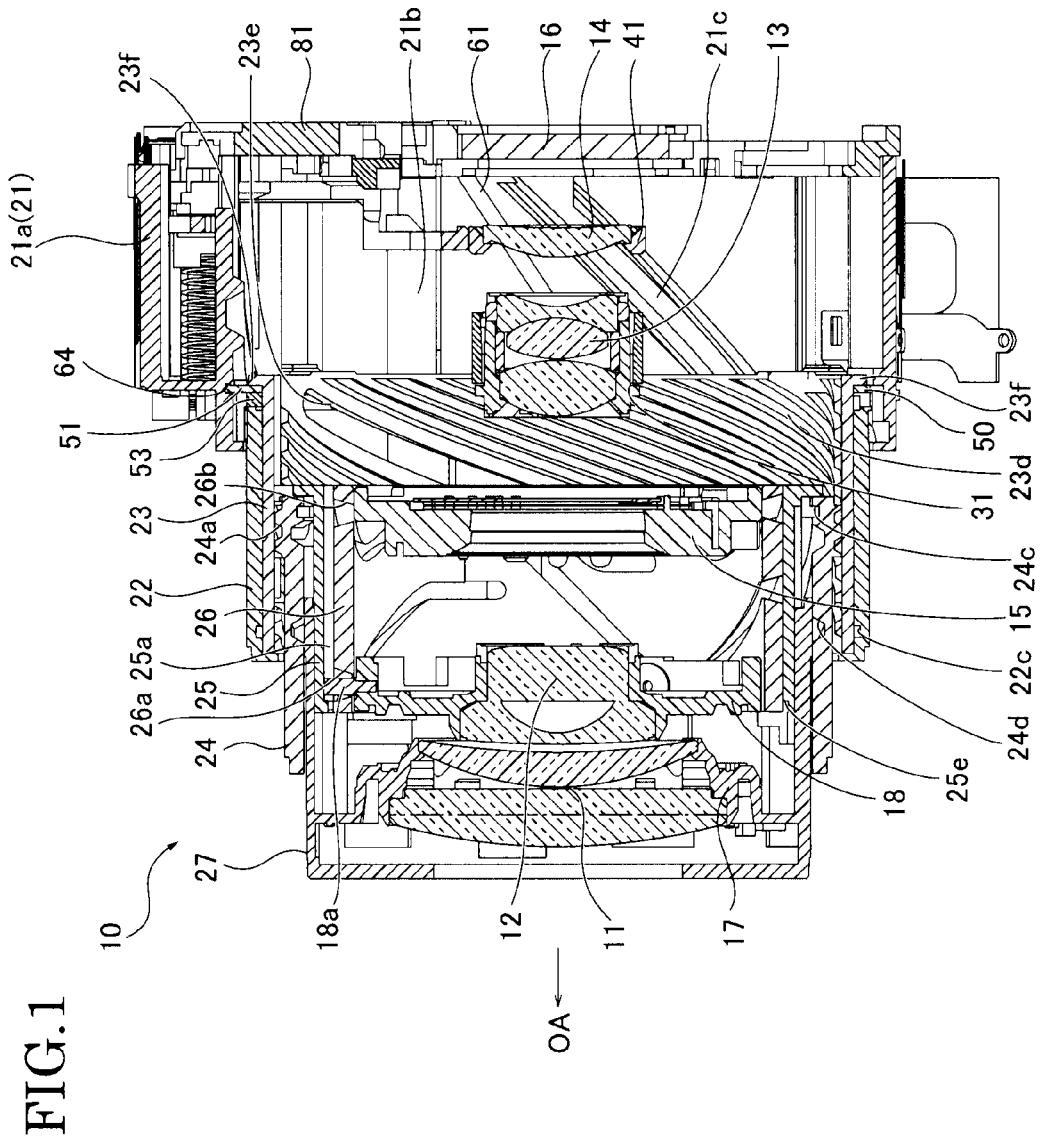
FIG. 1 is a schematic cross-sectional view showing a lens barrel 10 according to an example of the present invention.

Referring to the drawings, a description will be hereinbelow given for an embodiment of a lens barrel of the present invention and an image taking apparatus including the lens barrel.

(Embodiment)

Figure 2:
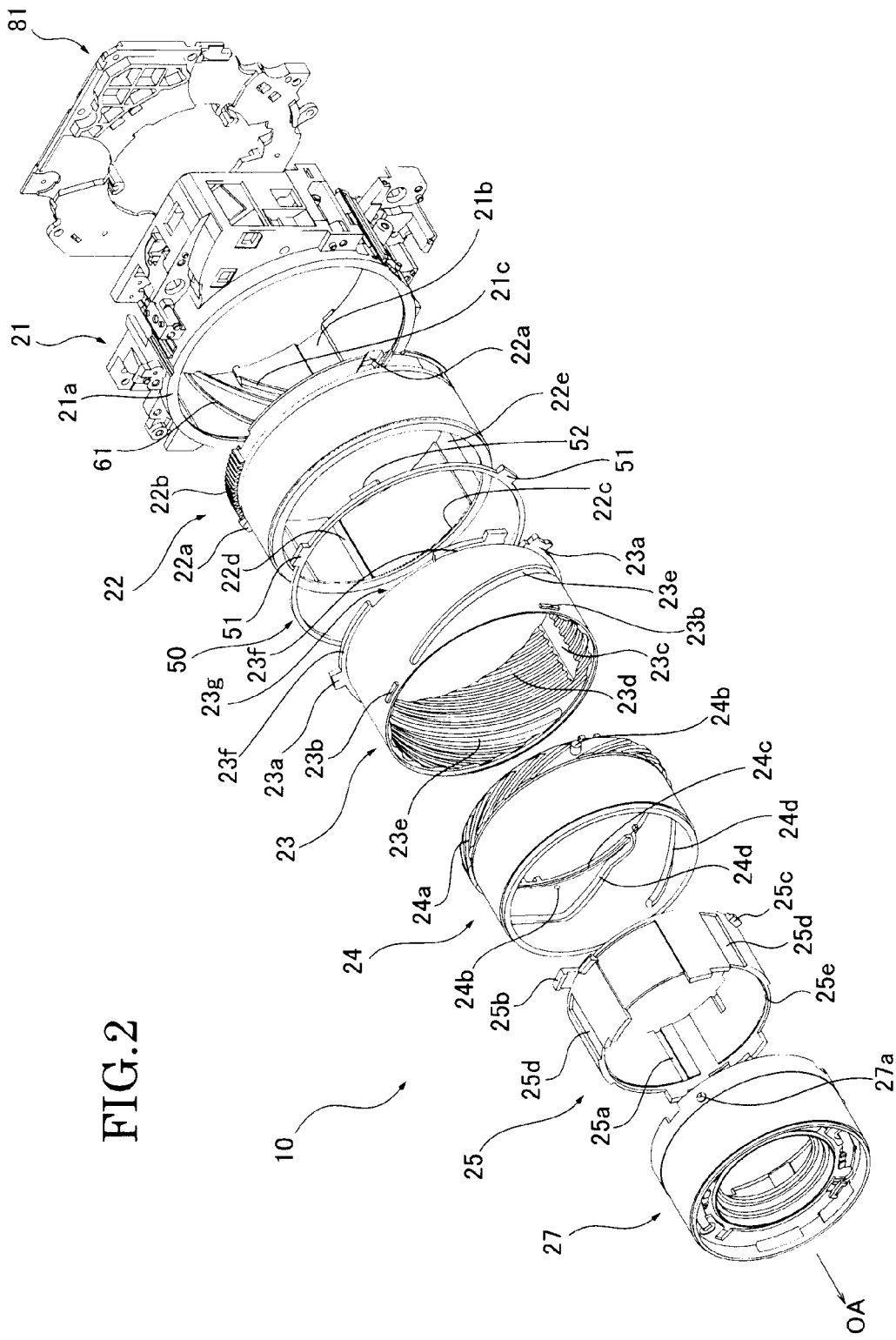
FIG. 2 is a schematic perspective view showing components of the lens barrel in an exploded manner.

Descriptions will be provided for a schematic configuration of a lens barrel 10 as an embodiment of the lens barrel of the present invention by use of FIGS. 1 to 10. For the purpose of making the configuration understood easily, FIG. 2 shows the configuration of the lens barrel 10 by omitting a first lens group 11, a second lens group 12, a third lens group 13, a fourth lens group 14, a shutter/stop unit 15, a solid state image sensor 16, a first lens holding frame 17, a second lens holding frame 18, and a cam barrel 26.

As shown in FIG. 1, an optical system including the lens barrel 10 includes the first lens group 11, the second lens group 12, the third lens group 13, the fourth lens group 14, the shutter/stop unit 15, the solid state image sensor 16, the first lens holding frame 17, the second lens holding frame 18, a fixation frame 21 (see FIG. 2), a first rotary barrel 22, a first liner 23, a second rotary barrel 24, a second liner 25, the cam barrel 26, a linear advancement barrel 27, a ring member 50 and a barrel base 81. Incidentally, the first rotary barrel 22, the second rotary barrel 24 and the linear advancement barrel 27 function as a movable lens barrel.

Descriptions will be provided for the optical system (photographic lens system) as put in a photographic state (see FIG. 1 and the like). From an object, the first lens group 11, the second lens group 12, the third lens group 13 and the fourth lens group 14 are arranged in this order. The shutter/stop unit 15 is inserted and placed between the second lens group 12 and the third lens group 13. The solid state image sensor 16 made from a CCD (charge-coupled device) and the like is placed, facing the image surface of the fourth lens group 14. The first to fourth lens groups 11 to 14 jointly constitute a focal length variable zoom lens. In this description, a photographic optical axis OA is defined as an optical axis of the photographic lens system, that is to say, a rotational symmetrical axis which represents the location of the center axis of the group of the optical elements as put in the photographic state.

The first lens group 11 is formed from one or more lenses. The first lens group 11 is fixed to and held by the linear advancement barrel 27 with the first lens holding frame 17 for integrally holding the first lens group 11.

The second lens group 12 is formed from one or more lenses.

The second lens group 12 is supported by the cam barrel 26 and the second liner 25 with cam followers 18a, which are provided in the second lens holding frame 18 for integrally holding the second lens group 12, inserted through second lens group-assigned cam grooves 26a of the cam barrel 26, and with the cam follower 18a engaging with a linear advancement groove 25a of the second liner 25.

The third lens group 13 is formed from one or more lenses. The third lens group 13 is integrally held by the third lens holding frame 31. The third lens group 13 is retracted from the photographic optical axis OA while put in a retracted storage state, and is placed on the photographic optical axis OA while put in the photographic state.

The fourth lens group 14 is formed from one or more lenses. The fourth lens group 14 is integrally held by the fourth lens holding frame 41. The fourth lens group 14 is retracted from the photographic optical axis OA while put in a retracted storage state, and is placed on the photographic optical axis OA while put in the photographic state. The fourth lens group 14 is used as a focus lens for the adjustment for distinct vision, that is to say, for adjusting the focus.

The shutter/stop unit 15 includes the shutter and the stop. The shutter/stop unit 15 is supported by the cam barrel 26 and the second liner 25 with integrally formed cam followers (not illustrated) inserted through shutter/stop unit-assigned cam grooves 26b of the cam barrel 26, and with the cam follower 18a engaging with the linear advancement groove 25a of the second liner 25.

The fixation frame 21 has a cylinder-shaped fixed barrel portion 21a (see FIG. 2 and the like) in its inside. As shown in FIGS. 1 and 2, linear advancement grooves 21b extending in the axial direction and cam grooves 21c are formed in the inner peripheral surface of the fixed barrel portion 21a. Key portions 23a (described later) of the first liner 23 respectively engage with the linear advancement grooves 21b, while cam followers 22a (described later) of the first rotary barrel 22 respectively engage with the cam grooves 21c. The first rotary barrel 22 is fitted in the fixed barrel portion 21a.

The first rotary barrel 22 is shaped like a barrel, which enables the first rotary barrel 22 to be fitted in the fixed barrel portion 21a. The cam followers 22a, which are helicoidal, and a gear portion 22b are formed on the outer peripheral surface of a base end portion of the first rotary barrel 22. A guide groove 22c and a linear advancement groove 22d are provided in the inner peripheral surface of the first rotary barrel 22. The guide groove 22c is provided along a plane orthogonal to the photographic optical axis OA, and is shaped like a ring. The guide groove 22c functions as a linear advancement guide member. The linear advancement groove 22d is a guide groove extending along the photographic optical axis OA (photographic optical path).

The first rotary barrel 22 is provided inside the fixed barrel portion 21a with its cam followers 22a engaging with the respective cam grooves 21c. The first rotary barrel 22 is designed to be revolvable around the photographic optical axis OA with respect to the fixed barrel portion 21a, or the barrel base 81. The guide function of the cam followers 22a and the cam grooves 21c makes the first rotary barrel 22 move in the direction of the photographic optical axis OA (photographic optical path) in accordance with the revolution of the first rotary barrel 22. The first liner 23 is fitted in the first rotary barrel 22.

The first liner 23 is shaped like a barrel, which enables the first liner 23 to be fitted in the first rotary barrel 22. The key portions 23a and followers 23b are provided on the outer peripheral surface of the first liner 23. The key portions 23a are formed projecting from the base end portion of the first liner 23, and engage with the respective linear advancement grooves 21b of the fixed barrel portion 21a. The followers 23b are provided projecting along a plane orthogonal to the photographic optical axis OA in their respective radial directions from the center of the revolution. The followers 23b are made to engage with the ring-shaped groove guide 22c after passing through insertion grooves 22e of the first rotary barrel 22 which extend along the photographic optical axis OA (the photographic optical path). The above-described configuration makes it possible for the first rotary barrel 22 and the first liner 23 to integrally move with respect to the fixed barrel portion 21a in the direction of the photographic optical axis OA (the photographic optical path), and concurrently to revolvingly move around the photographic optical axis OA relative to each other. This enables the first liner 23 to revolve with respect to the first rotary barrel 22 which is a rotary barrel, and concurrently to move closer to and farther from the fixed barrel portion 21a in the direction of the photographic optical axis OA integrally with the first rotary barrel 22. Accordingly, the first liner 23 functions as a linear advancement guide barrel which can be fitted in the first rotary barrel 22.

Linear advancement grooves 23c and a helicoid 23d are provided in the inner surface of the first liner 23. The linear advancement grooves 23c extend in the direction of the photographic optical axis OA (the photographic optical path). Key portions 25b (described later) provided projecting from the outer surface of the base end portion of the second liner 25 engage with the linear advancement grooves 23c, respectively. The helicoid 23d is screwed to a helicoid 24a (described later) formed on the outer peripheral surface of the base end portion of the second rotary barrel 24.

Clearance grooves 23e are formed in the first liner 23. The clearance grooves 23e are provided there, each penetrating through a peripheral wall part serving as the first liner 23, and each shaped like a spiral which agrees with the helicoid 23d, in order for cam followers 24b (described later) of the second rotary barrel 24 to be inserted through the respective clearance grooves 23e. The size dimension of the clearance grooves 23e and the size dimension of the cam followers 24b are set in a way that: the clearance grooves 23e should not inhibit the movement of the corresponding cam followers 24b which are inserted through the clearance grooves 23e; and there exist clearances between the clearance grooves 23e and the cam followers 24b, respectively.

In addition, a flange portion 23f is formed on the outer peripheral surface of the first liner 23. The flange portion 23f projects from the base end portion of the outer peripheral surface in radial directions with a predetermined widthwise dimension, and extends in the circumferential direction of the outer peripheral surface. Parts of the flange portion 23f respectively overlap the projecting base portions of the key portions 23a when viewed in the outer circumferential direction. Furthermore, in this embodiment, the flange portion 23f is divided into multiple sections when viewed in the circumferential direction, and a discontinuity section 23g is formed in the flange portion 23f. The second rotary barrel 24 is fitted in the first liner 23.

The second rotary barrel 24 is shaped like a barrel, which enables the second rotary barrel 24 to be fitted in the first liner 23. The helicoid 24a is formed on the outer peripheral surface of the base end portion of the second rotary barrel 24. The helicoid 24a is screwed to the helicoid 23d provided in the inner periphery of the first liner 23. Moreover, the cam followers 24b are projectingly provided on the outer peripheral surface of a vicinity of the base end portion of the second rotary barrel 24. The cam followers 24b engage respectively with linear advancement grooves 22d, which are provided in the inner periphery of the first rotary barrel 22, through the clearance grooves 23e of the first liner 23.

Because of this configuration, when the first rotary barrel 22 revolves around the optical axis, the cam followers 24b of the second rotary barrel 24 are pressed by the linear advancement grooves 22d of the first rotary barrel 22, and the second rotary barrel 24 thereby revolves around the optical axis. In this respect, the guide operation of the helicoid 23d and helicoid 24a makes the second rotary barrel 24 move in the direction of the photographic optical axis OA with respect to the first liner 23, because the revolution of the first liner 23 is prevented by the engagement between the key portions 23a and the corresponding linear advancement grooves 21b in the fixed barrel portion 21a, as described above.

A guide groove 24c and cam grooves 24d are formed in the inner peripheral surface of the second rotary barrel 24. The guide groove 24c is provided along a plane orthogonal to the photographic optical axis OA (the photographic optical path), and one or more followers (or keys) 25c (described later) of the second liner 25 engage with the guide groove 24c. The above-described configuration enables the second liner 25 and the second rotary barrel 24 to integrally move in the direction of the photographic optical axis OA (photographic optical path), and concurrently to move revolvingly around the photographic optical axis OA relative to each other. The cam grooves 24d are those for the movement of the linear advancement barrel 27. The second liner 25 is fitted into the second rotary barrel 24.

The second liner 25 is shaped like a barrel, which enables the second liner 25 to be fitted in the second rotary barrel 24. The key portions 25b, the followers (or keys) 25c and linear advancement grooves 25d are formed on the outer peripheral surface of the base end portion of the second liner 25. The key portions 25b project outward from the rear end of the second liner 25 in their respective radial directions, each shaped like a key. The key portions 25b are in slide contact with a rear end surface of the second liner 24, and front end parts of the key portions 25b engage with the linear advancement grooves 23c of the first liner 23, respectively. In addition, the followers (or keys) 25c are projected outward from the outer peripheral surface of the second liner 25 in the respective radial directions. The followers (or keys) 25c are linear advancement guiding members whose engagement with the guide groove 24c of the second rotary barrel 24 makes only a linear advancement movement force of the second rotary barrel 24, which makes a linear advancement while revolving, act on the second liner 25. The linear advancement grooves 25d are extended in the outer peripheral surface of the second liner 25 in the axial direction. This makes the second liner 25 move in the direction of the photographic optical axis OA (the photographic optical path) integrally with the second rotary barrel 24 with respect to the first liner 23, and prevents the revolution of the second liner 25 around the photographic optical axis OA.

The linear advancement grooves 25a extending in the direction of the photographic optical axis OA (the photographic optical path) and a guide groove 25e extending along a plane orthogonal to the photographic optical axis OA (the photographic optical path) are formed in the inner peripheral surface of the second liner 25. The cam followers 18a of the second lens holding frame 18, which are inserted through the second lens groove-assigned cam grooves 26a, and the cam followers (not illustrated) of the shutter/stop unit 15 engage with the linear advancement grooves 25a. Furthermore, although their illustration is omitted, followers (or keys) serving as linear advancement guide members, which are projectingly provided on (front-side portions of) the outer peripheral surface of the cam barrel 26, engage with the guide groove 25e. The cam barrel is shaped like a barrel, and is fitted in the inner periphery of the second liner 25. The cam barrel 26 is designed to make revolving operation integrally with the second rotary barrel 24 with engagement protrusions (not illustrated), which are projectingly provided on the outer periphery of the base end portion of the cam barrel 26, fittingly engaging with the base end portion of the second rotary barrel 24. The above-described configuration enables the cam barrel 26 and the second liner 25 to integrally move in the direction of the photographic optical axis OA (the photographic optical path), and concurrently to move revolvingly around the photographic optical axis OA (the photographic optical path) relative to each other.

A base end-side part of the linear advancement barrel 27 is inserted between the second liner 25 and the second rotary barrel 24. The linear advancement barrel 27 is shaped like a barrel, which enables the linear advancement barrel 27 to be fitted in the second rotary barrel 24. Cam followers 27a are projectingly provided on the outer peripheral surface of a vicinity of the base end portion of the linear advancement barrel 27. The cam followers 27a engage with the respective cam grooves 24d which are formed in the inner peripheral surface of the second rotary barrel 24. In addition, although their illustration is omitted, key portions are formed on the inner peripheral surface of the linear advancement barrel 27, and engage with the respective linear advancement grooves 25d in the outer peripheral surface of the second liner 25. This enables the linear advancement barrel 27 to move (i.e., linearly move) in the direction of the photographic optical axis OA (the photographic optical path) with respect to the second liner 25, and prevents the revolution of the linear advancement barrel 27 around the photographic optical axis OA.

Figure 3:
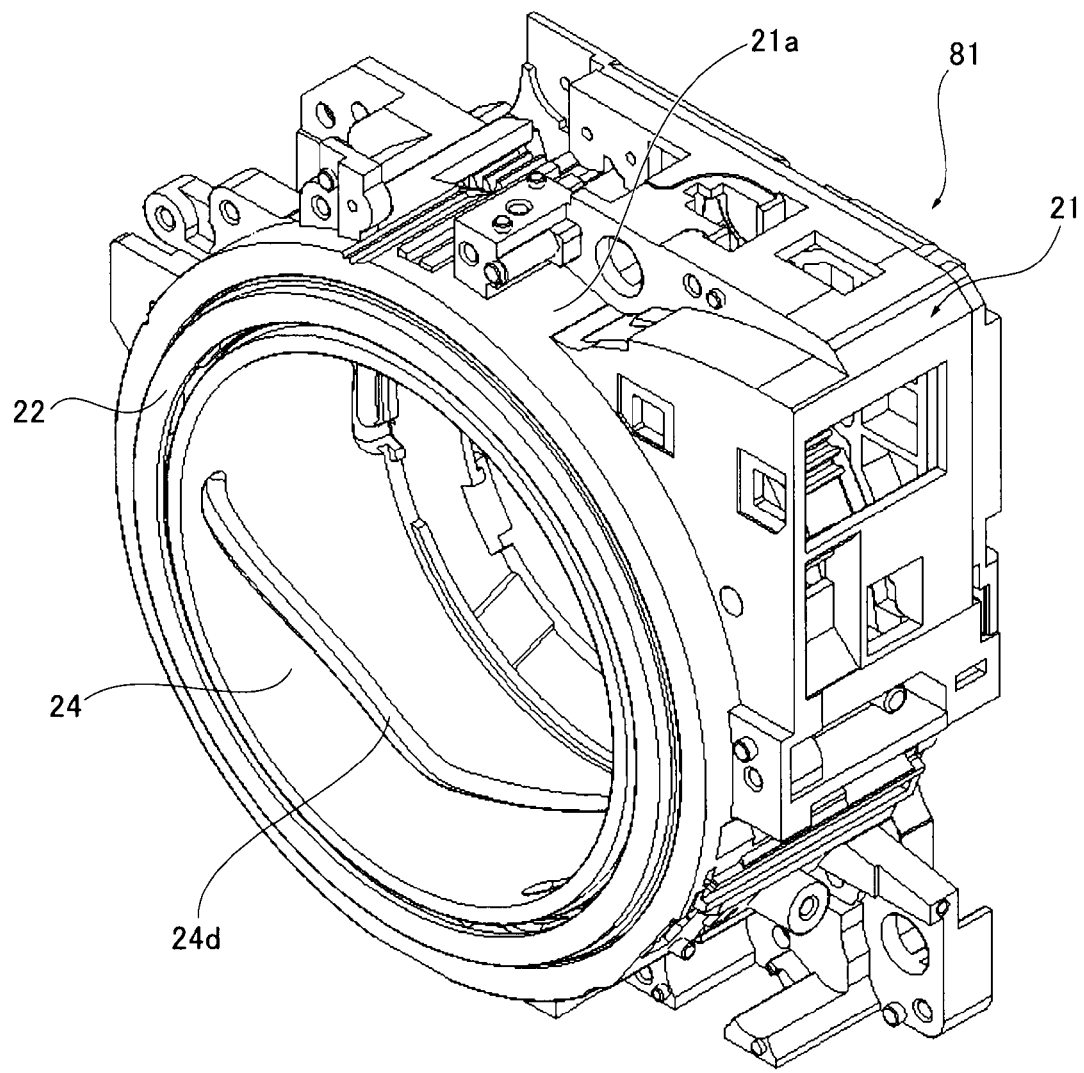
FIG. 3 is a perspective view schematically showing the lens barrel which is collapsed.
Figure 4:
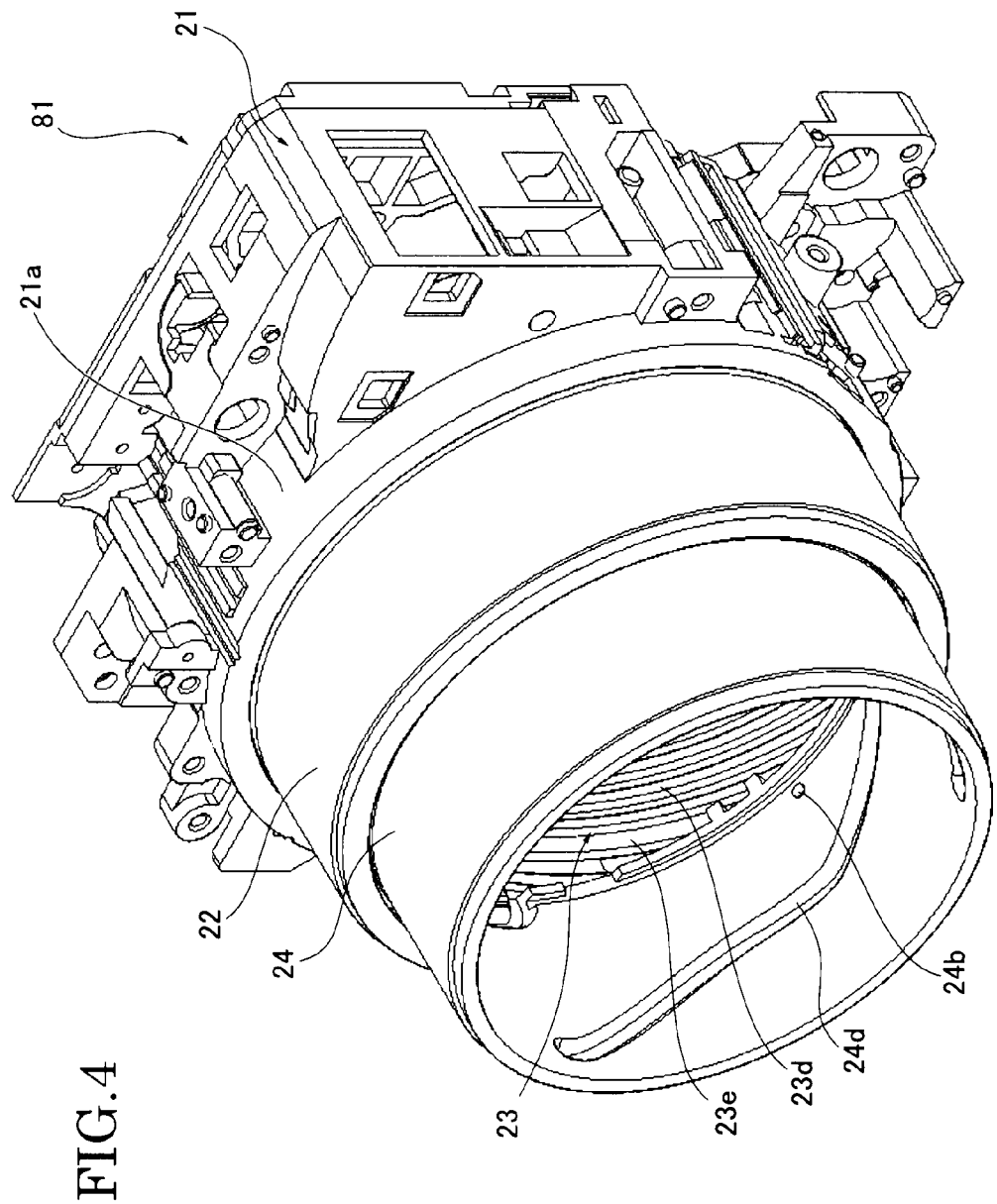
FIG. 4 is a perspective view schematically showing the lens barrel which is extended to a maximum extended position.

Next, descriptions will be provided for how the foregoing lens barrel 10 operates. FIG. 3 is a perspective view schematically showing the lens barrel 10 which is collapsed. FIG. 4 is a perspective view schematically showing the lens barrel 10 which is extended to a maximum extended position. It should be noted that FIGS. 3 and 4 show only the fixation frame 21 (the fixed barrel portion 21a), the first liner 23, the second rotary barrel 24 and the barrel base 81, and omit the others, for the purpose of making the operation understood easily.

In the lens barrel 10, the first rotary barrel 22 is made to revolve in response to the gear-based transmission of a driving force from a drive motor (not illustrated) to the first rotary barrel 22 via a gear (not illustrated) screwed to the gear portion 22b of the first rotary barrel 22 depending on the necessity. Once the first rotary barrel 22 is revolvingly driven while in a collapsed state (see FIG. 3), the first rotary barrel 22 makes an advancement movement toward an object (a photographic subject) in the direction of the photographic optical axis OA with respect to the fixed barrel portion 21a due to the guide effect of the cam follower 22a and the cam grooves 21c. Furthermore, once the first rotary barrel 22 is revolvingly driven, the second rotary barrel 24 revolves around the optical axis with respect to the first liner 23 because its linear advancement grooves 22d press the cam followers 24d of the second rotary barrel 24, while the second rotary barrel 24 moves in the direction of the photographic optical axis OA with respect to the first liner 23 because of the guide effect of the helicoid 23d of the first liner 23 whose revolution is prevented and the helicoid 24a. This series of operation puts the first rotary barrel 22, the first liner 23, and the second rotary barrel 24 in a state of being extended to their respective maximum extendable positions, for example, to their telephoto ends (see FIG. 4). In this event, in the lens barrel 10, the second liner 25, the cam barrel 26 and the linear advancement barrel 27 appropriately revolve and make advancement or retreat movement in response to the operation of the first rotary barrel 22, the first liner 23 and the second rotary barrel 24 as described above. Thereby, the first lens group 11 held by the first lens holding frame 17, the second lens group 12 held by the second lens holding frame 18, and the shutter/stop unit 15 make their zooming operation in a predetermined manner. In addition, although its illustration is omitted, the third lens group 13 integrally held by the third lens holding frame 31 is placed on the photographic optical axis OA (the photographic optical path), and concurrently makes its zooming operation in a predetermined manner. Furthermore, the fourth lens group 14 integrally held by the fourth lens group holding frame 41 is placed on the photographic optical axis OA (the photographic optical path), and concurrently makes its focusing operation in a predetermined manner.

Figure 6:
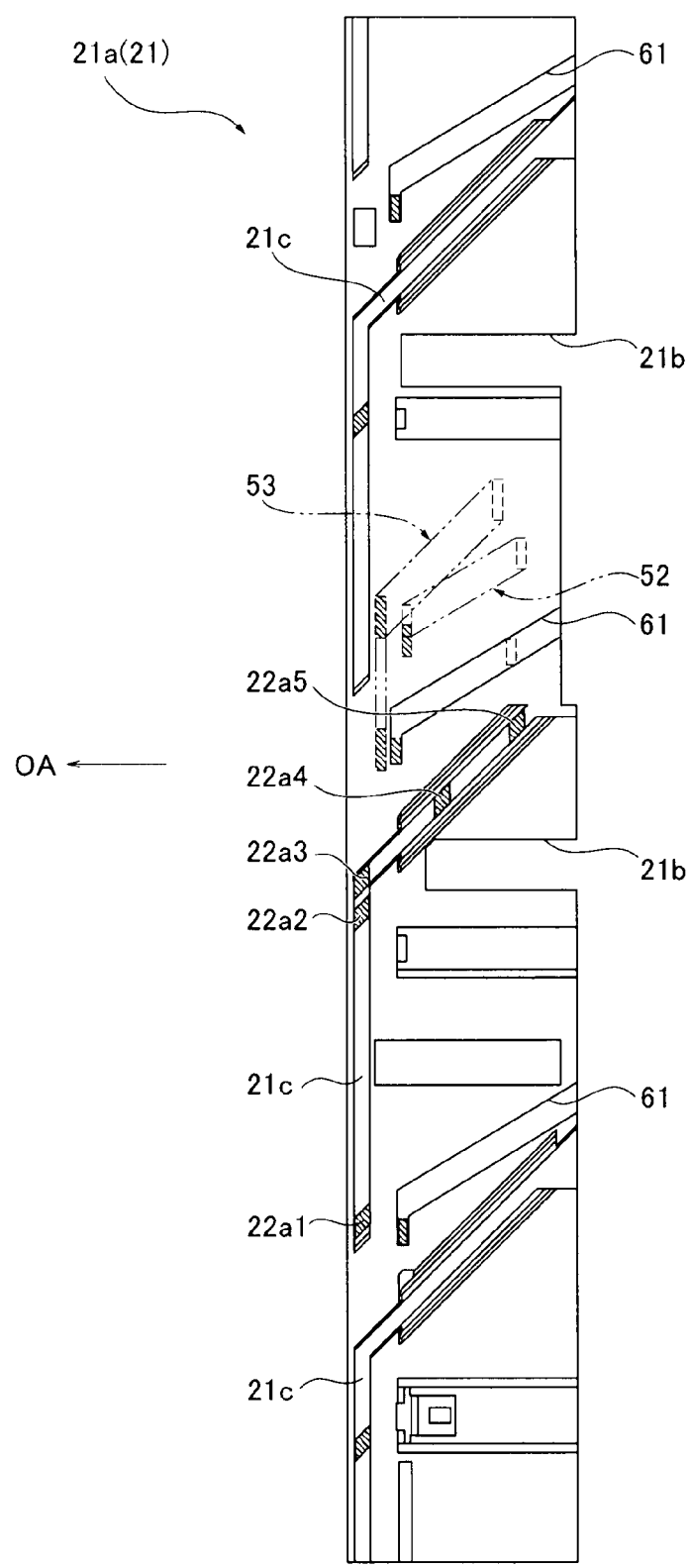
FIG. 6 is a development view schematically showing the shapes, respectively, of cam grooves formed in a fixed barrel portion in a developed manner.

In the above-described configuration, the first rotary barrel 22 makes the cam followers 22a engage with the helicoidal cam grooves 21c (see FIG. 6), but not is the first rotary barrel 22 simply helicoidally screwed to the fixed barrel portion 21a. For this reason, the first rotary barrel 22 is fully extended to its maximum extended position by driving the cam followers 22a to their wide-angle positions in the cam grooves 21c (along parts of the cam grooves 21c which incline with respect to the photographic optical axis OA) starting with their storage state. Thereafter, while the cam followers 22a are driven from their wide-angle positions to their telephoto positions, the first rotary barrel 22 revolves at a fixed position without moving in the direction of the photographic optical axis OA (the photographic optical path), because, as shown in FIG. 6, the object-side end portions of the cam grooves 21c are in parallel to the end surface of the fixed barrel portion 21a. As described above, the embodiment makes the cam followers 22a and the cam grooves 21c function as helicoids for the cam mechanism for connecting the first rotary barrel 22 and the fixed barrel portion 21a together. In other words, from a viewpoint of the cam mechanism, while the cam followers 22a engage with the parts of the cam grooves 21c which incline with respect to the photographic optical axis OA, the inclined parts constitute advancement/retreat movement areas for making the first rotary barrel 22 advance from or retreat to the fixed barrel portion 21a in the direction of the photographic optical axis OA. On the other hand, while the cam followers 22a engage with the other parts of the cam grooves 21c which are in parallel to the end surface of the fixed barrel portion 21a, the parallel parts constitute idle revolving areas for making the first rotary barrel 22 revolve without making the first rotary barrel 22 move in the direction of the photographic optical axis OA with respect to the fixed barrel portion 21a. Thereby, the parts of the cam grooves 21c which incline with respect to the photographic optical axis OA function as advancement/retreat groove parts, while the other parts of the cam grooves 21c which are in parallel to the end surface of the fixed barrel portion 21a function as revolution groove parts.

For this reason, while the first rotary barrel 22 moves to its wide-angle position starting with its collapsed state, first of all, the first rotary barrel 22 is extended toward the subject while revolving, and reaches its maximum extended position in the middle of its revolution. In other words, the first rotary barrel 22, which is the barrel nearby the fixed barrel portion 21a, and the first liner 23 are fully extended in the earliest phase in the extending operation. This secures a space in which the third lens holding frame 31 is to be inserted onto the photographic optical axis OA (the photographic optical path) before the actual insertion of the third lens holding frame 31. As the retracted lens holding frames, the third lens holding frame 31 and the fourth lens holding frame 41 can start to make their advancement operation, once the spaces for their insertion are secured. Because, in this manner, the third lens holding frame 31 and the fourth lens holding frame 41 start to make their advancement operation immediately after the first rotary barrel 22 reaches its maximum extended portion, it is possible to minimize an amount of time which is needed for the transition to the wide-angle position starting with the collapsed state at times such as a time when the power supply is turned on.

Furthermore, while the first rotary barrel 22 moves from its wide-angle position to its telephoto position, the first rotary barrel 22 revolves while kept in the maximum extended position in the photographic optical axis OA. For this reason, the first lens group 11, the second lens group 12 and the shutter/stop unit 15 make their zooming operation in the predetermined manner. In response to their zooming operation, the third lens group 13 makes its zooming operation in the predetermined manner, and the fourth lens group 14 makes its focusing operation in the predetermined manner. Thus, the lens barrel 10 is set in its photographic state when the first rotary barrel 22 is situated in the idle revolving area between its wide-angle and telephoto positions.

In a case where the drive motor (not illustrated) is made up using a generally-used DC (Direct Current) motor, the positions of the first rotary barrel 22 and the like can be controlled by counting the number of produced drive pulses by a zoom count detector that is formed from a pinion gear shaped like an encoder, which is directly fixed to the output shaft of the drive motor, and for example, a photointerruptor which is placed in the vicinity of the pinion gear. It should be noted that, although the detection of driven positions is achieved by use of the detector formed from the encoder and the photointerruptor with the DC motor used as the drive source for moving the first rotary barrel 22, the same function can be achieved by replacing the DC motor and the detection mechanism with a pulse motor. To this end, the drive motor, together with a spline gear and the like, not only functions as the movable lens barrel driving source for making the movable lens barrel advance and retreat in the direction of the photographic optical axis OA, but also functions as the lens holding frame driving means for driving the movable lens holding frames by use of the movable lens barrel.

Figure 5:
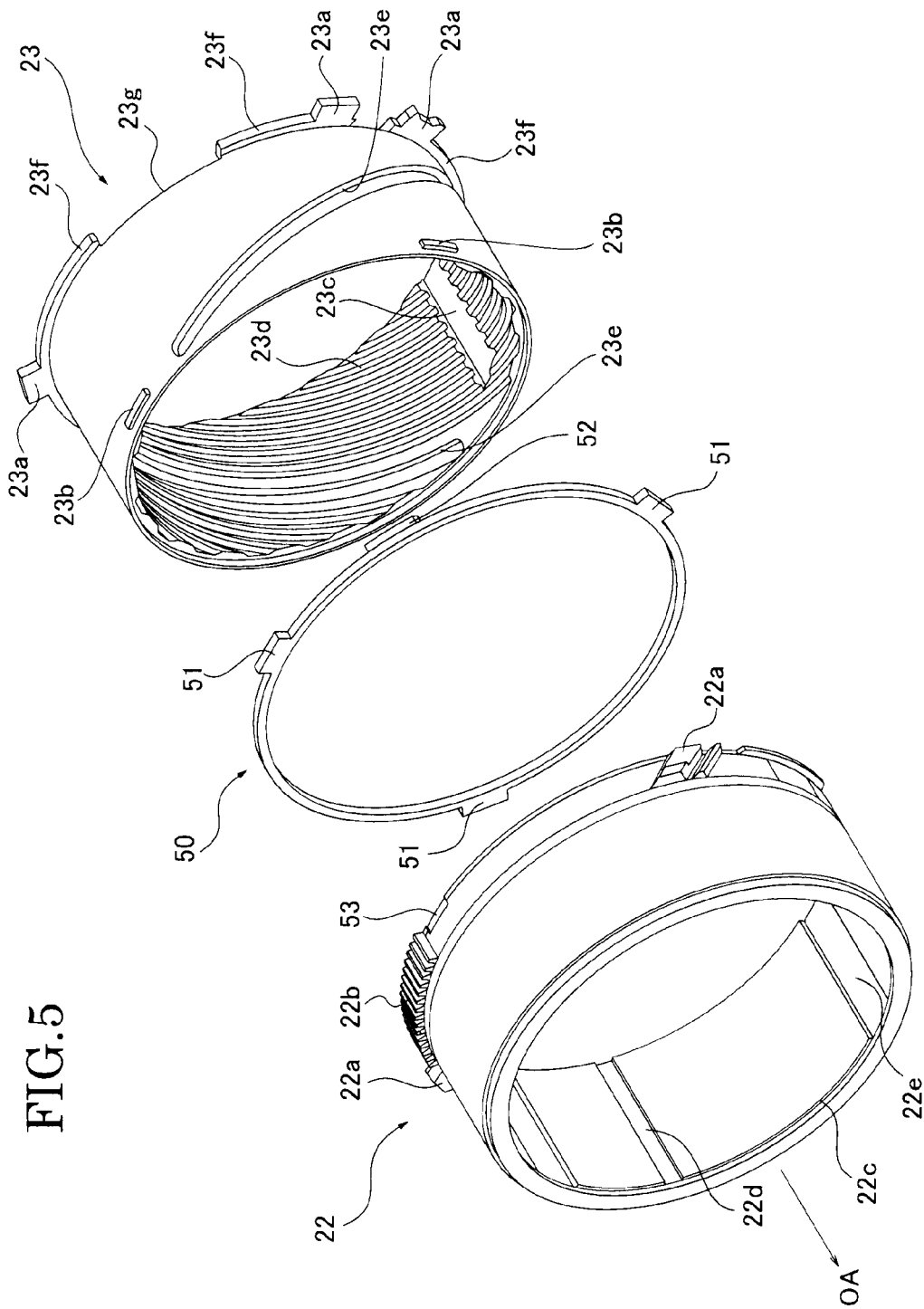
FIG. 5 is a schematic perspective view showing the structures of a first rotary barrel, a ring member and a first liner in the same direction as they are assembled together.

Next, descriptions will be provided for a feature of the lens barrel 10 of the invention by use of FIGS. 1 to 11. It should be noted that, because FIG. 5 shows the first rotary barrel 22, the ring member 50 and the first liner 23 in the same direction as they are assembled together, the order of the arrangement of the first rotary barrel 22, the ring member 50 and the first liner 23 in FIG. 5 is different from the order of their arrangement in FIG. 2.

The ring member 50 is provided to the lens barrel 10. As shown in FIG. 5, the ring member 50 as a whole is shaped like a ring, and is made from a nonmagnetic metal material. The ring member 50 has an inner diameter dimension which enables the ring member 50 to surround the outer peripheral surface of the first liner 23 and concurrently to be in contact with the flange portion 23f of the first liner 23. In addition, the ring member 50 has an outer diameter dimension which enables the ring member 50 to be housed in the fixed barrel portion 21a (see FIG. 1). In this respect, the term "nonmagnetic" means having a property of not being magnetized even when a magnetized body (such as a magnet) is nearby, or having a property of not being affected by a magnetic attraction.

One or more protrusions 51 are provided to the ring member 50. The protrusions 51 are formed, projecting outward in the radial directions, and are capable of engaging with engagement sections 64 (see FIG. 6 and the like) of protrusion guide grooves 61 in the fixed barrel portion 21a in the direction of the photographic optical axis OA, respectively. In the embodiment, the protrusions 51 are respectively provided in three locations at equal intervals when viewed in the circumferential direction of the ring member 50.

In addition, at least one attracted portion 52 is provided to the ring member 50. The attracted portion 52 is formed from a plate-shaped member of a soft magnetic material. In this respect, the term "soft magnetic" means having a property of gaining magnetism or being affected by an magnetic attraction when a magnetized body (such as a magnet) is nearby although losing magnetism when the magnetized body (such as a magnet) is away. In addition, the term "losing magnetism" means having a property of at least making a magnetic force which hinders the operation or working of the lens barrel 10 no longer act, or in a favorable mode, a property of not being magnetized. In the embodiment, the single attracted portion 52 is attached to a rear surface (image surface-side surface) of the ring member 50 in a predetermined location when viewed in the circumferential direction of the ring member 50. For the operation of the ring member 50, an attracting portion 53 is provided to the first rotary barrel 22, while the protrusion guide grooves 61 are provided to the fixed barrel portion 21a.

The attracting portion 53 is a plate-shaped member made from a magnet for making the magnetic attraction act. In this embodiment, the attracting portion 53 is made from a permanent magnet. In this respect, the term "magnet" means a permanent magnet which maintains its magnetism, or an electromagnet or something similar which gains magnetism due to things such as the supplying of an electric power. The attracting portion 53 is provided to the rear end surface (the end surface of the base end provided with the cam followers 22a) of the first rotary barrel 22.

The protrusion guide grooves 61 are provided in the inner peripheral surface of the fixed barrel portion 21a in a way that makes the protrusion guide grooves 61 situated adjacent to the parts of the cam grooves 21c which incline with respect to the photographic optical axis OA, respectively. As shown in FIG. 6, the protrusion guide grooves 61 are capable of movably accepting the respective protrusions 51 of the ring member 50. In addition, the engagement sections 64 which are portions to engage with the protrusions 51 are formed in the protrusion guide grooves 61, respectively. In this embodiment, the protrusion guide grooves 61 are provided in three locations in the inner peripheral surface of the fixed barrel portion 21a at equal intervals, corresponding to the three protrusions 51 of the ring member 50, respectively.

Figure 7:
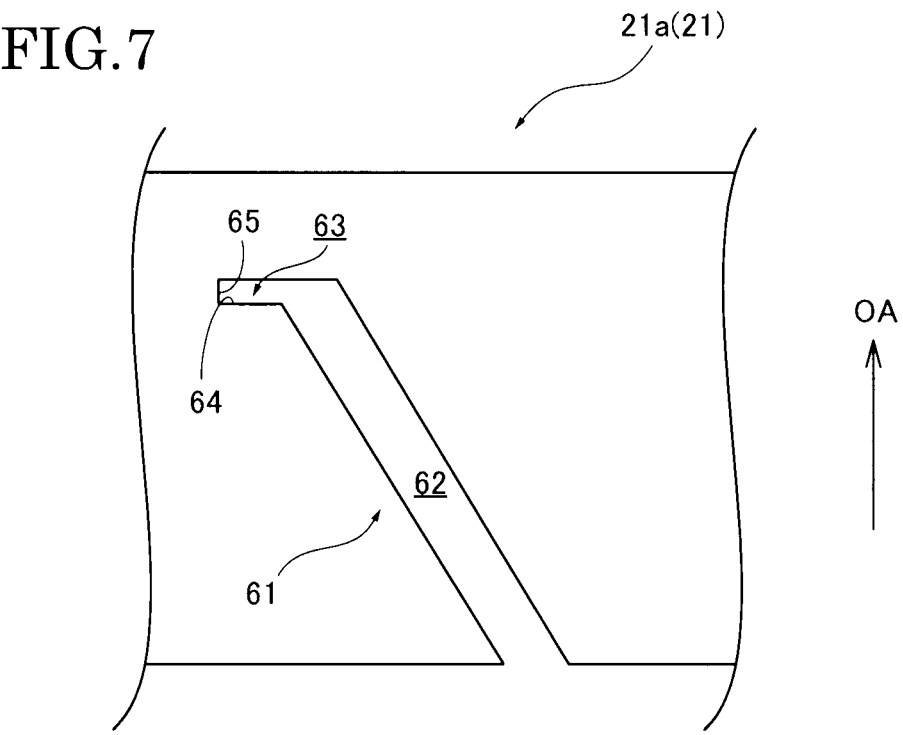
FIG. 7 is a development view, similar to FIG. 6, which shows the structure of a protrusion guide groove 61 in a magnified manner for the sake of explanation of it.

As shown in FIG. 7, each protrusion guide groove 61 includes a linear advancement guide groove section 62 and a revolution guide groove section 63. The linear advancement guide groove section 62 is extended in a direction including the photographic optical axis OA, and is opened at the base end (which is closer to the barrel base 81) of the fixed barrel portion 21a. The linear advancement guide groove section 62 has a size dimension which enables the corresponding protrusion 51 of the ring member 50 to move in the direction of the photographic optical axis OA. In this embodiment, the linear advancement guide groove section 62 inclines in the same direction as does the advancement/retreat groove part (which is the part inclining with respect to the photographic optical axis OA) of the corresponding cam groove 21c, with respect to the direction of the photographic optical axis OA. In addition, an inclination angle of the linear advancement guide groove section 62 to the photographic optical axis OA is set smaller than an inclination angle of the advancement/retreat groove part of the cam groove 21 to the photographic optical axis OA (see FIG. 6). Furthermore, in this embodiment, the cam grooves 21c are provided in the respective three locations in the inner peripheral surface of the fixed barrel portion 21a. The protrusion guide grooves 61 are provided in a way that makes one protrusion guide groove 61 situated between each neighboring two of the three cam grooves 21c with its linear advancement guide groove section 62 adjacent to the advancement/retreat groove part of the corresponding cam groove 21c. The revolution guide groove section 63 continues to the upper end (which is closer to the object, and is shown as being situated above in FIG. 7 when viewed from the front) of the linear advancement guide groove section 62.

The revolution guide groove sections 63 are extended in parallel to the end surface of the fixed barrel portion 21a, and are extended in the same direction as are the revolution groove parts of the cam grooves 21c, which are object-side end portions of the cam grooves 21c (see FIG. 6). In other words, the direction of the revolution guide groove sections 63 is set the same as the direction in which the cam followers 22a shift their connection by the cam mechanism from the positions where the revolution groove parts and the advancement/retreat groove parts of the cam grooves 21c join together (hereinafter referred to as a "joint positions between the revolution groove parts and the advancement/retreat groove parts of the cam grooves 21c) (i.e., the positions where the cam grooves 21c change from the idle revolving areas into the advancement/retreat movement areas (see reference sign 22a3 in FIG. 6)) to extension ends (see reference sign 22a1 in FIG. 6) of the revolution groove parts of the cam grooves 21c, respectively. Each revolution guide groove section 63 has a size dimension which enables the corresponding protrusion 51 of the ring member 50 to move in a direction orthogonal to the photographic optical axis OA. In this embodiment, each revolution guide groove section 63 has the size dimension which enables the revolution guide groove section 63 to accept the corresponding protrusion 51 without coming into contact with the protrusion 51. An end portion of each revolution guide groove section 63, which is opposite from its open end continuing to the linear advancement guide groove section 62, is closed when viewed in a direction in which the revolution guide groove section 63 extends. A wall surface of the revolution guide groove section 63, which is closer to the image surface (situated below in FIG. 7 when viewed from the front), forms the engagement section 64. In addition, a wall surface of the closed extension end of the revolution guide groove section 63 forms a revolution restriction section 65. The engagement section 64 is a flat surface along a plane orthogonal to the photographic optical axis OA. The engagement section 64 has a lengthwise dimension which is at least equal to that of the corresponding protrusion 51 of the ring member 50 when viewed in a direction in which the engagement section 64 extends. The revolution restriction section 65 is a flat surface along the photographic optical axis OA, that is to say, a flat surface orthogonal to the direction in which the revolution guide groove section 63 extends. The revolution guide groove sections 63 enables the relationship among the protrusions 51 and the attracted portion 52 of the ring member 50 and the attracting portion 53 of the first rotary barrel 22 in terms of their relative positions to perform an operation, which will be described below.

Figure 8:
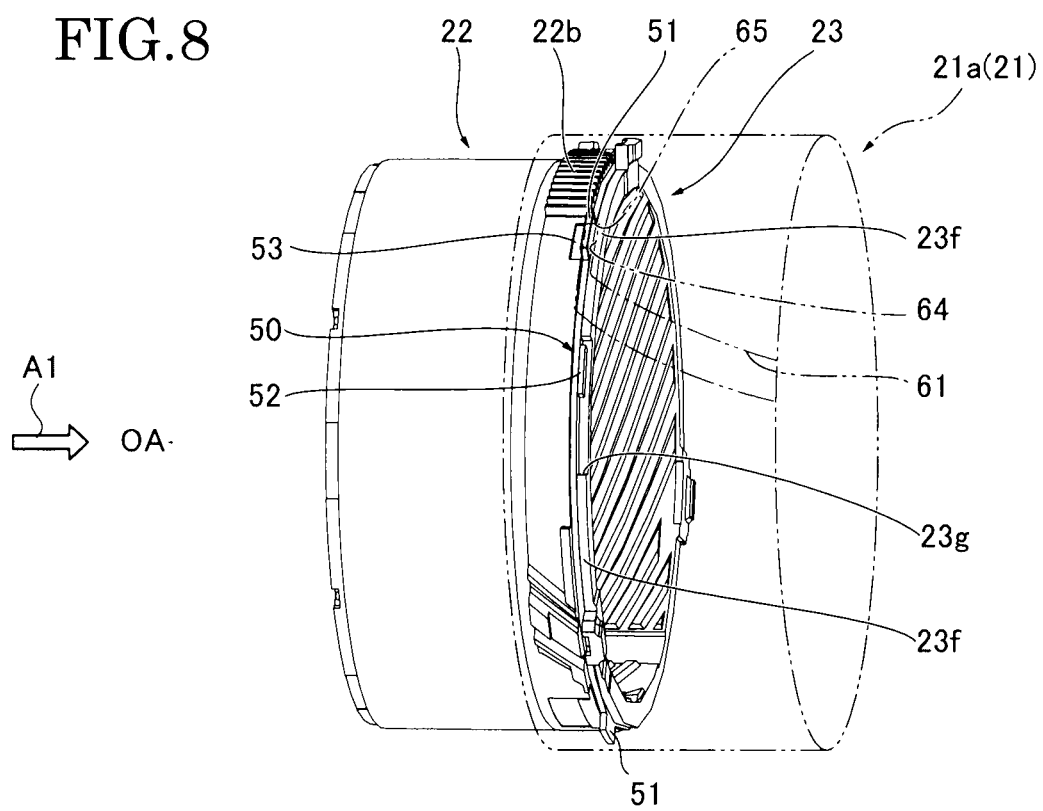
FIG. 8 is a schematic perspective view showing how the first rotary barrel, the ring member and the first liner are assembled together inside the fixed barrel portion.
Figure 9:
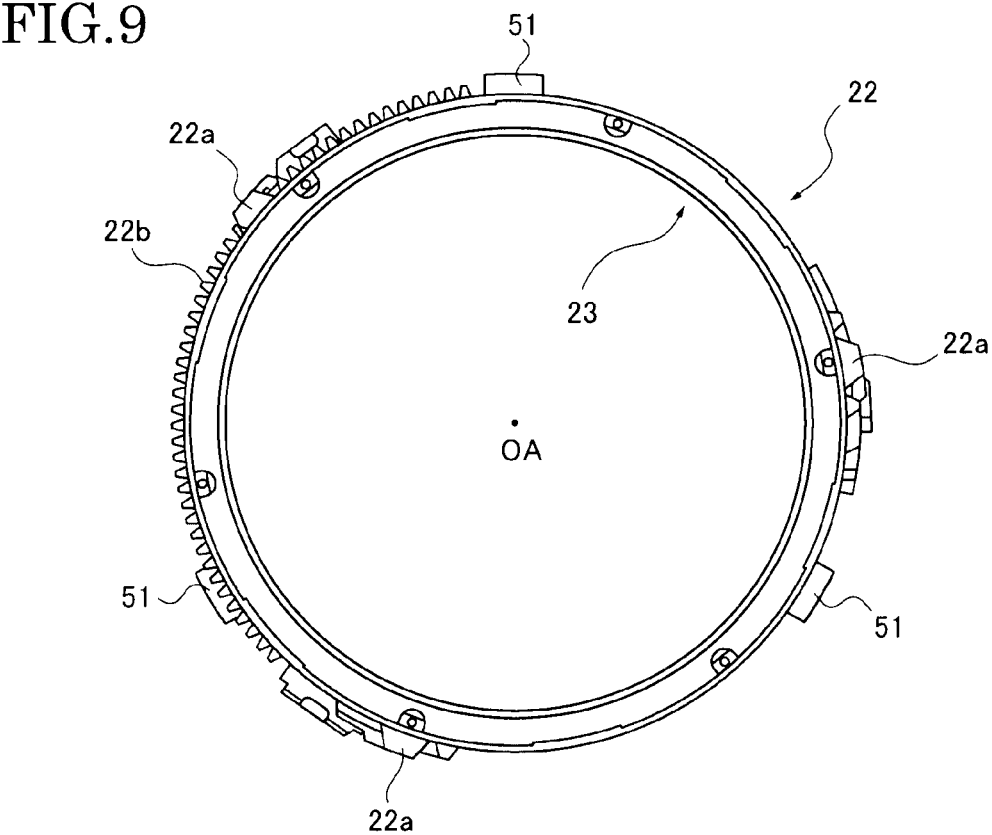
FIG. 9 is an explanatory diagram showing how the state shown in FIG. 8 looks when viewed in a direction indicated with an arrow A1.
Figure 10:
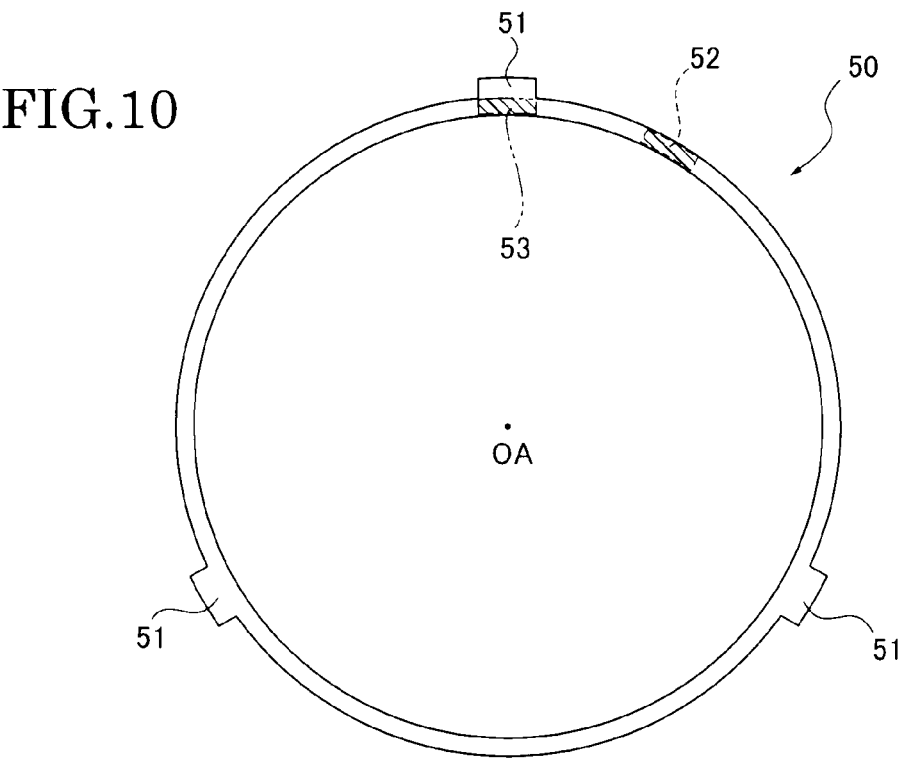
FIG. 10 is an explanatory diagram showing a relationship between the ring member and an attracting portion in the state shown in FIG. 9.

In the lens barrel 10, as shown in FIG. 5, the first liner 23, the ring member 50 and the first rotary barrel 22 are assembled together by: inserting the first liner 23 in the ring member 50; pressing the ring member 50 to the flange portion 23f of the first liner 23; and fitting the first liner 23 into the first rotary barrel 22 (see FIG. 8). As shown in FIG. 8, the ring member 50 is situated between the flange portion 23f of the first liner 23 and the rear end surface of the first rotary barrel 22 in the direction of the photographic optical axis OA, and is capable of revolving around the photographic optical axis OA with respect to the first liner 23 and the first rotary barrel 22. In addition, the position of the ring member 50 in the direction of the photographic optical axis OA is fixed. In this case, the ring member 50 is put in a rotary posture which makes the attracted portion 52 situated in the discontinuity section 23g of the first liner 23, and can be situated between the flange portion 23f of the first liner 23 and the rear end surface of the first rotary barrel 22. The first rotary barrel 22 in which the first liner 23 is fitted with the ring member 50 interposed in between is fitted into the fixed barrel portion 21a. FIG. 8 shows a state in which the first rotary barrel 22 (the first liner 23) advances to its maximum extended position and reaches its maximum rotary position (in which the lens barrel 10 is extended to its maximum extended position (see FIG. 4)) inside the fixed barrel portion 21a. In addition, FIG. 9 is an explanatory diagram showing how the state shown in FIG. 8 looks when viewed in a direction indicated with an arrow A1. FIG. 10 is an explanatory diagram showing a positional relationship between the ring member 50 and the attracting portion 53 in the state shown in FIG. 9.

Next, descriptions will be provided for how the ring member 50 operates when the first rotary barrel 22 is revolvingly driven with respect to the fixed barrel portion 21a by use of FIGS. 8 to 11. FIGS. 11A to 11E are explanatory diagrams schematically showing how the first rotary barrel 22, the first liner 23 and the ring member 50 operate with respect to the fixed barrel portion 21a for the sake of explanation of it. FIG. 11A shows their maximum extended positions as shown in FIG. 8. FIG. 11B shows how the first rotary barrel 22 is made to revolve for its retraction until the first rotary barrel 22 takes a predetermined posture, starting with the state shown in FIG. 11A. FIG. 11C shows a position at which the first rotary barrel 22 starts to be retracted (hereinafter referred to a "retraction starting position" of the first rotary barrel 22). FIG. 11D shows how the first rotary barrel 22 is made to revolve for its retraction until the first rotary barrel 22 takes another predetermined posture, starting with the state shown in FIG. 11C. FIG. 11E shows a retracted position. It should be noted that: what correspond to the position of one cam follower 22a in the corresponding cam grooves 21c in FIGS. 11A, 11B, 11C, 11D and 11E are denoted by reference signs 22a1, 22a2, 22a3, 22a4 and 22a5 in FIG. 6, respectively. In addition, FIG. 6 indicates the movements, respectively, of the attracted portion 52 and the attracting portion 53 in response to this operation with imaginary lines which are marked with reference signs 52 and 53.

Figure 11A:
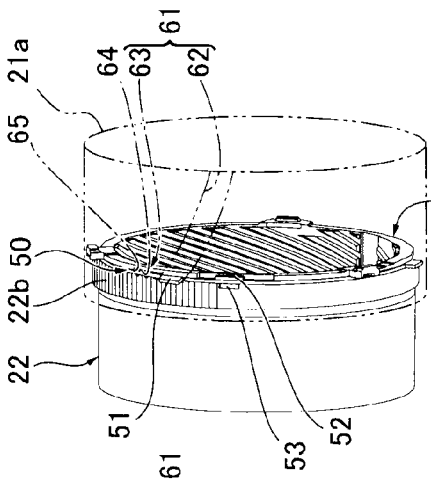
FIGS. 11A to 11E are explanatory diagrams schematically showing how the first rotary barrel, the first liner and the ring member operate with respect to the fixed barrel portion for the sake of explanation of it.

In a case where the lens barrel 10 is situated in its maximum extended position, the first rotary barrel 22 is placed in its telephoto position because the cam followers 22a are situated in the extension ends (see reference sign 22a1 in FIG. 6) in the revolution groove parts of the cam grooves 21c, respectively. In this case, as shown in FIG. 11A, the attracting portion 53 of the first rotary barrel 22 is situated in a position which is away from the attracted portion 52 of the ring member 50 when viewed in the circumferential direction. In this case, the protrusions 51 of the ring member 50 are respectively in contact with the revolution restriction sections 65 in the extension ends of the revolution guide groove sections 63 of the protrusion guide grooves 61. For this reason, the protrusions 51 are put in their respective positional relationships which make the protrusions 51 opposed to the engagement sections 64 formed in the revolution guide groove sections 63, that is to say, in their respective engagement-enabling positions. In this embodiment, because each revolution guide groove section 63 has the size dimension which enables the revolution guide groove section 63 to accept the corresponding protrusion 51 without coming in contact with the protrusion 51, space is made between the protrusion 51 and the corresponding the engagement section 64.

When, starting with the state shown in FIG. 11A, the first rotary barrel 22 is made to revolve for the retraction, the first rotary barrel 22 revolves without changing its position in the direction of the photographic optical axis OA with respect to the fixed barrel portion 21a (see FIGS. 11A and 11B), because the cam followers 22a are situated in the revolution groove parts of the cam grooves 21c, that is to say, because their connection by the cam mechanism occurs in the idle revolving areas. In this event, the first liner 23 does not change its position or its rotary posture, because the first liner 23 is prevented from revolving with respect to the fixed barrel portion 21a and is enabled to revolve with respect to the first rotary barrel 22. Once the first rotary barrel 22 is made to revolve for its retraction until the first rotary barrel 22 takes the predetermined posture, that is to say, until the cam followers 22a reach the vicinities (see reference signs 22a2 in FIG. 6) of the opened ends (i.e., the joint positions between the revolution groove parts and the advancement/retreat groove parts) of the revolution groove parts of the cam grooves 21c, the attracting portion 53 is put in a positional relationship, which enables the attracting portion 53 to exert its magnetic attraction on the attracted portion 52 of the ring member 50, when viewed in the circumferential direction. When the first rotary barrel 22 takes this predetermined posture, the lens barrel 10 is put in a state of being retracted to a maximum extent while the lens barrel 10 is in the photographic state, or in a state in which the first rotary barrel 22 itself has not started its retraction yet although the first rotary barrel 22 goes past such a position for its retraction. The "positional relationship which enables the attracting portion 53 to exert its magnetic attraction," which just has been mentioned above, means the one which enables the rotary force of the first rotary barrel 22 to be transmitted to the ring member 50 by use of the magnetic attraction between the attracting portion 53 and the attracted portion 52, that is to say, the one which enables the ring member 50, whose protrusions 51 are situated in the respective revolution guide groove sections 63, to revolve in response to the revolution of the first rotary barrel 22. In this embodiment, while in this positional relationship, the attracting portion 53 overlaps the attracted portion 52 of the ring member 50 when viewed in the circumferential direction. In other words, the attracting portion 53 and the attracted portion 52 are opposed to each other when viewed in the direction of the photographic optical axis OA. Incidentally, when the first rotary barrel 22 is made to revolve for the retraction, the attracting portion 53 and the attracted portion 52 are thought to attract each other even before the attracting portion 53 and the attracted portion 52 become opposed to each other in the direction of the photographic optical axis OA. However, the contact of the protrusions 51 with the respective revolution restriction sections 65 prevents the revolution of the ring member 50.

Figures 11B, 11C:
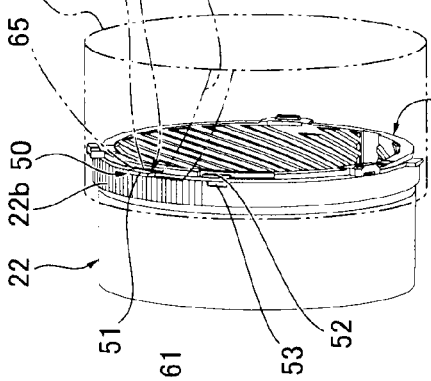

When, starting with the state shown in FIG. 11B, the first rotary barrel 22 is made to revolve for its retraction, the ring member 50 revolves in response to the revolution of the first rotary barrel 22 (see FIGS. 11B and 11C), because the attracting portion 53 and the attracted portion 52 are put in the positional relationship which enables the attracting portion 53 and the attracted portion 52 to exert their magnetic attraction on each other. For this reason, in the lens barrel 10, the attracting portion 53 and the attracted portion 52 function as a rotary force transmitting unit capable of transmitting force, which is produced by the revolution of the first rotary barrel 22 with respect to the fixed barrel portion 21a, to the ring member 50. When the first rotary barrel 22 is made to revolve for the retraction until the first rotary barrel 22 reaches the retraction starting position of the first rotary barrel 22, that is to say, until the cam followers 22a reach the joint positions between the revolution groove parts and the advancement/retreat groove parts of the cam grooves 21c (i.e., the positions where the cam grooves 21c change from the idle revolving areas into the advancement/retreat movement areas (see reference sign 22a3 in FIG. 6)), the ring member 50 is made to revolve with respect to the fixed barrel portion 21a, as shown in FIG. 11C, in order that the protrusions 51 should become situated in the open ends of the revolution guide groove sections 63, which continue to the linear advancement guide groove sections 62. For this reason, the protrusions 51 become released from their respective positional relationships which make the protrusions 51 opposed to the engagement sections 64 formed in the revolution guide groove sections 63 when viewed in the direction of the photographic optical axis OA. That is to say, the protrusions 51 are put in their release positions.

Figure 11D:
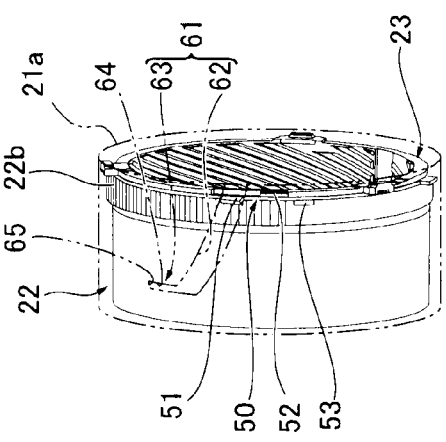

When, starting with the state shown in FIG. 11C, the first rotary barrel 22 is made to revolve for the retraction, the first rotary barrel 22 performs its revolution while moving its position in the direction of the photographic optical axis OA with respect to the fixed barrel portion 21a toward the image surface (see FIG. 11D), because the cam followers 22a are situated in the advancement/retreat groove parts of the cam grooves 21c, that is to say, because their connection by the cam mechanism occurs in the advancement/retreat movement areas. In this event, the first liner 23 changes its position in the direction of the photographic optical axis OA without changing its rotary posture (see FIG. 11D), because the first liner 23 is prevented from revolving with respect to the fixed barrel portion 21a, is enabled to revolve with respect to the first rotary barrel 22, and is concurrently enabled to move integrally with the first rotary barrel 22 in the direction of the photographic optical axis OA. During this event, the protrusions 51 of the ring member 50 can enter the respective linear advancement guide groove sections 62, because, while in the state shown in FIG. 11C, the protrusions 51 are situated in the open ends of the revolution guide groove sections 63 of the protrusion guide grooves 61, which continue to the linear advancement guide groove sections 62. For this reason, the ring member 50 is not inhibited from moving in the direction of the photographic optical axis OA with respect to the fixed barrel portion 21a. Accordingly, when the first rotary barrel 22 is made to revolve for its retraction until the first rotary barrel 22 takes a predetermined posture in the course of the retraction, that is to say, until the cam followers 22a reach predetermined positions (see reference sign 22a4) in the advancement/retreat groove parts of the cam grooves 21c, the first rotary barrel 22 makes retreat movement toward the image surface in the direction of the photographic optical axis OA with respect to the fixed barrel portion 21a, as shown in FIG. 11D, due to the guide effect of the cam followers 22a and the cam grooves 21c. In response to the movement of the first rotary barrel 22, the first liner 23 makes retreat movement as well. During this time, the ring member 50 makes retreat movement toward the image surface in the direction of the photographic optical axis OA together with the first rotary barrel 22 and the first liner 23, while changing its rotary posture with respect to the fixed barrel portion 21a depending on the guide effect of the linear advancement guide groove sections 62 of the protrusion guide grooves 61 on the protrusions 51, because: the ring member 50 is placed between the flange portion 23f of the first liner 23 and the rear end surface of the first rotary barrel 22; and the ring member 50 is enabled to revolve with respect to the first rotary barrel 22 and the first liner 23.

When, starting with the state shown in FIG. 11D, the first rotary barrel 22 is made to revolve for the retraction until the first rotary barrel 22 reaches the retracted position, that is to say, until the cam followers 22 reach the open end portions (end portions (see reference sign 22a5 in FIG. 6) closer to the solid state image sensor 16 in the fixed barrel portion 21a) of the advancement/retreat groove parts of the cam grooves 21c, the first rotary barrel 22 and the first liner 23 are retracted into the fixed barrel portion 21a after being moved closest to the image surface in the direction of the photographic optical axis OA with respect to the fixed barrel portion 21a. In response to this, the ring member 50 is made to move closest to the image surface in the direction of the photographic optical axis OA while making the protrusions 51 situated in the open end portions (end portions closer to the solid state image sensor 16 in the fixed barrel portion 21a) of the linear advancement guide groove sections 62 of the protrusion guide grooves 61 with respect to the fixed barrel portion 21a. In the embodiment, during this event, the positional relationship between the attracting portion 53 of the first rotary barrel 22 and the attracted portion 52 of the ring member 50 becomes different when viewed in the circumferential direction, that is to say, the relationship which makes the attracting portion 53 and the attracted portion 52 opposed to each other when viewed in the direction of the photographic optical axis OA is undone, because the inclination angle to the photographic optical axis OA is different between the revolution guide groove sections 63 of the protrusion guide grooves 61 and the advancement/linear groove parts of the cam grooves 21c.

Figure 11E:
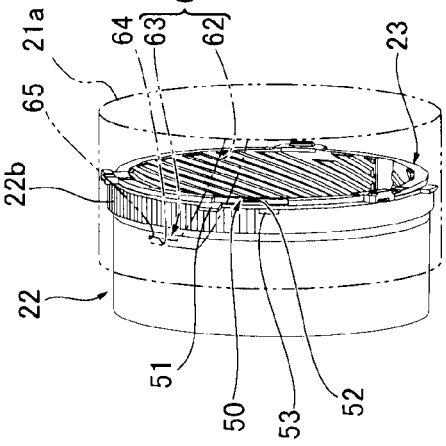

In addition, in a case where the lens barrel 10 moves from the retracted position to the photographic position, the first rotary barrel 22 is made to revolve for its advancement starting at the retracted position shown in FIG. 11E. To this end, the lens barrel 10 makes an operation in a sequence reverse to what has been described, until the first rotary barrel 22 reaches the retraction starting position (see FIG. 11C). Once the first rotary barrel 22 reaches the retraction starting position, that is to say, once the cam followers 22a reach joint positions (see reference sign 22a3 in FIG. 6) between the revolution groove parts and the advancement/retreat groove parts of the cam grooves 21c, the first rotary barrel 22 and the ring member 50 are situated closest to the object when viewed in the direction of the photographic optical axis OA, and concurrently take their rotary posture which puts the attracting portion 53 and the attracted portion 52 in the positional relationship which enables the attracting portion 53 and the attracted portion 52 to exert their magnetic attraction (i.e., the positional relationship which makes the attracting portion 53 and the attracted portion 52 opposed to each other in the direction of the photographic optical axis OA, in this embodiment), as shown in FIG. 11C. In this event, the protrusions 51 are situated in the open end portions of the revolution guide groove sections 63, which continue to the linear advancement guide groove sections 62.

When the first rotary barrel 22 is made to revolve for the advancement starting with the state shown in FIG. 11C, the ring member 50 revolves in response to the revolution of the first rotary barrel 22 (see FIGS. 11C and 11B), because the attracting portion 53 and the attracted portion 52 are put in the positional relationship which enables the attracting portion 53 and the attracted portion 52 to exert their magnetic attraction. For this reason, once the first rotary barrel 22 is made to revolve for the advancement until the first rotary barrel 22 reaches the predetermined position, that is to say, until the cam followers 22 reach the vicinities (see reference signs 22a2 in FIG. 6) of the opened ends (i.e., the joint positions between the revolution groove parts and the advancement/retreat groove parts) of the revolution groove parts of the cam grooves 21c, the ring member 50 is made to revolve with the fixed barrel portion 21a, as shown in FIG. 11B, in order that the protrusions 51 should be situated in positions which make the protrusions 51 in contact with the revolution restriction sections 65 located in the extension ends of the revolution guide groove sections 63. Thereby, the protrusions 51 are put in the positional relationship which makes the protrusions 51 opposed to the engagement sections 64 formed in the revolution guide groove sections 63 when viewed in the direction of the photographic optical axis OA.

When the first rotary barrel 22 is made to revolve for the advancement starting with the state (b) shown in FIG. 11B, the ring member 50 tries to revolve in response to the revolution of the first rotary barrel 22, because the attracting portion 53 and the attracted portion 52 are put in the positional relationship which enables the attracting portion 53 and the attracted portion 52 to exert their magnetic attraction. However, the ring member 50 is prevented from revolving because the protrusions 51 are in contact with the revolution restriction sections 65 in the revolution guide groove sections 63. For this reason, when the first rotary barrel 22 revolves for the advancement toward the maximum extended position, the ring member 50 keeps the rotary posture which keeps the protrusions 51 situated in the positions which makes the protrusions 51 in contact with the revolutions restriction sections 65 in the revolution guide groove sections 63. Accordingly, the positional relationship between the attracting portion 53 of the first rotary barrel 22 and the attracted portion 52 of the ring member 50 becomes different when viewed in the circumferential direction, that is to say, the relationship which makes the attracting portion 53 and the attracted portion 52 opposed to each other when viewed in the direction of the photographic optical axis OA is undone. Thereafter, the first rotary barrel 22 reaches the maximum extended position for the advancement, that is to say, the cam followers 22a reach the extension ends (see reference sign 22a1 in FIG. 6) in the revolution groove parts of the cam grooves 21c.

Thus, in the lens barrel 10 of the embodiment, when the cam followers 22a are situated in the joint positions between the revolution groove parts and the advancement/retreat groove parts of the cam grooves 21c (i.e., the positions where the cam grooves 21c change from the idle revolving areas to the advancement/retreat movement areas (see reference sign 22a3 in FIG. 6)), the joint positions respectively constitute the ends of the idle revolving areas, which continue to the advancement/retreat movement areas, for the connection by the cam mechanism. On the other hand, when the cam followers 22a are situated in the extension ends (see reference sign 22a1 in FIG. 1) of the revolution groove portions of the cam grooves 21c, the extension ends constitute the opposite ends of the idle revolving areas. In addition, when the cam followers 22a are situated in the vicinities (see reference sign 22a2 in FIG. 6) of the open ends (i.e., the joint positions between the revolution groove parts and the advancement/retreat groove parts) of the revolution groove parts of the cam grooves 21c, the vicinities constitute the predetermined positions, which are away from the ends of the idle revolving areas which continue to the advancement/retreat movement areas, for the connection by the cam mechanism. Moreover, the attracted portion 52 of the ring member 50, the attracting portion 53 of the first rotary barrel 22, and the protrusion guide groove 61 (particularly, the revolution guide groove sections 63) of the fixed barrel portion 21a function as the rotary drive mechanism.

Figure 12A:
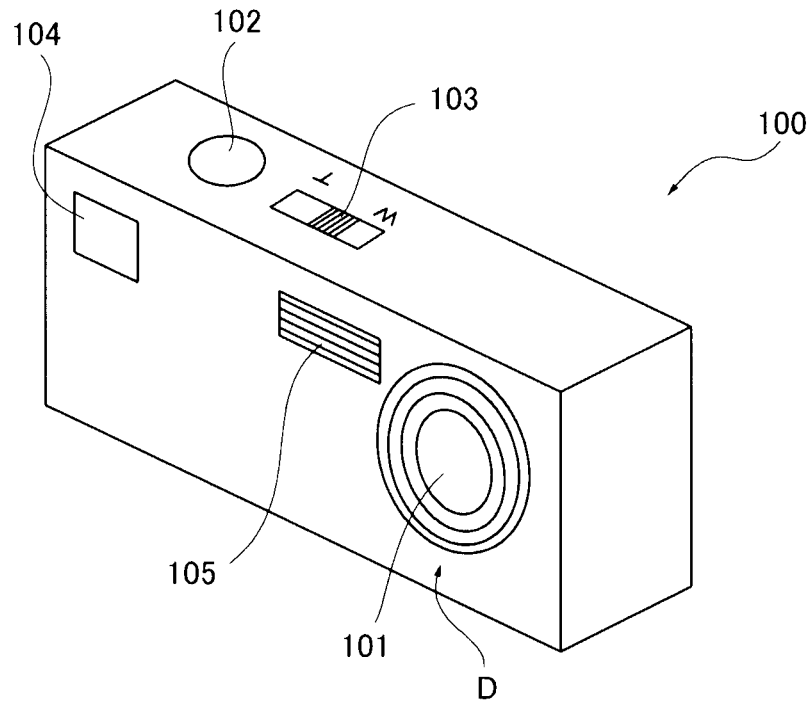
FIGS. 12A and 12B are perspective views schematically showing an external structure of a camera using the lens barrel 10 of the present invention, which is viewed from an object.
Figure 12B:
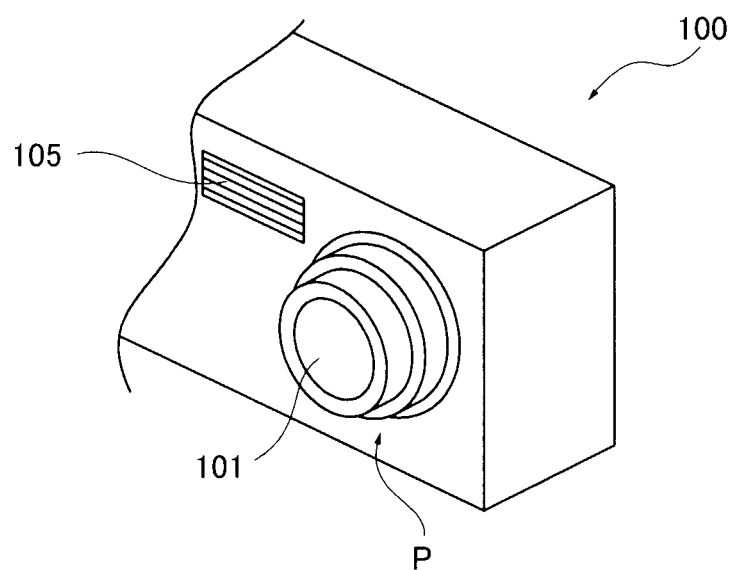
Figure 13:
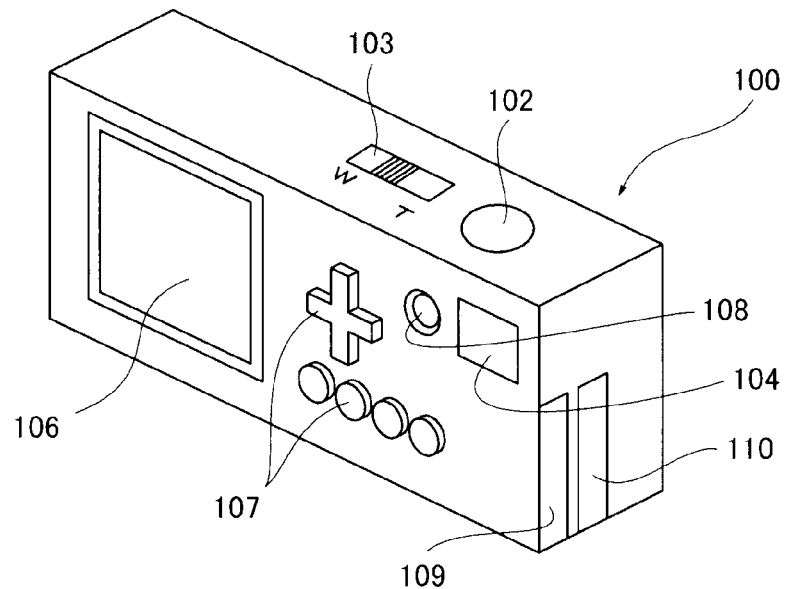
FIG. 13 is a schematic perspective view showing another external structure of the camera 100, which is viewed from a photographer, or from the rear of the camera.
Figure 14:
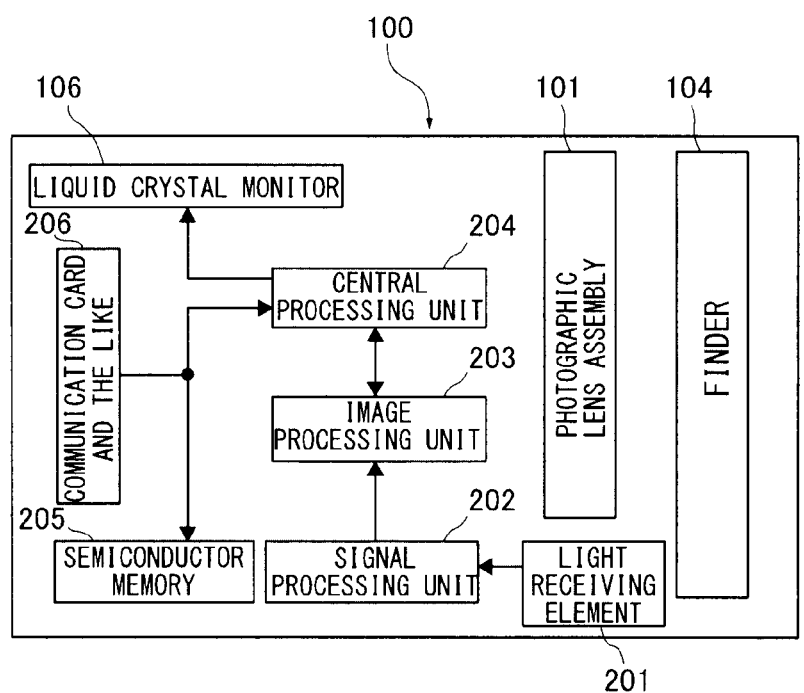
FIG. 14 is a block diagram showing a functional constitution of the camera.

Next, referring to FIGS. 12 to 14, descriptions will be provided for a case which a camera (image taking apparatus) 100 is constructed by employing, as a photographic optical system, an optical system including the lens barrel 10 shown as the foregoing embodiment. FIGS. 12A and 12B are perspective views showing an external appearance of the camera 100 which is viewed from an object, that is to say, from its front closer to a photographic subject. FIG. 13 is a schematic perspective view showing another external structure of the camera 100, which is viewed from a photographer, or from the rear of the camera. FIG. 14 is a block diagram showing a functional constitution of the camera 100. It should be noted that, although the following descriptions will be herein provided for the camera 100, mobile information terminal devices, such as PDAs (personal data assistants) and cellular phones, in which a camera function is installed, have been on the market in these years.

Many of such mobile information terminal devices include virtually the same functions and configurations as does the camera 100, although their external appearances are slightly different from that of the camera 100. The optical system including the lens barrel 10 of the present invention may be applied to these mobile information terminal devices. Similarly, the optical system including the lens barrel 10 of the present invention may be applied to image inputting apparatuses.

As shown in FIGS. 12A, 12B and 13, the camera 100 includes: a photographic lens assembly 101, a shutter release button 102, a zoom lever 103, a finder 104, a strobe 105, a liquid crystal monitor 106, a manipulation button 107, a power supply switch 108, a memory card slot 109, and a communication card slot 110. Furthermore, as shown in FIG. 14, the camera 100 includes a light receiving element 201, a signal processing unit 202, an image processing unit 203, a central processing unit (CPU) 204, a semiconductor memory 205, and a communication card 206. Although not illustrated clearly, these components are designed to operate by receiving a supply of an electric power from a battery as a drive power supply.

The camera 100 includes the photographic lens assembly 101, and the light receiving element 201 serving as an area sensor such as a CCD (charge couple device) image sensor. The camera 100 is designed to cause the light receiving element 201 to read an image of a photographic object, namely a subject, which is formed by the photographic lens assembly 101 which constitutes the photographic optical system. An optical system including the lens barrel 10 of the present invention, which has been described with regard to the embodiment, is used as this photographic lens assembly 101. To put it specifically, the optical system is made by use of the lenses and the like which are the optical elements constituting the lens barrel 10 (for example, the light receiving element 201 is made from the solid state image sensor 16 (see FIG. 16)). The lens barrel 10 includes a mechanism for holding the lenses and the like in a way that enables each of them to be moved and operated at least as a member of a corresponding one of the lens groups. In general, the mounting of the photographic lens assembly 101 on the camera 100 is achieved by mounting the photographic lens assembly 101 in the form of this optical system.

An output from the light receiving element 201 is processed by the signal processing unit 202 controlled by the central processing unit 204, and is thus converted into digitalized image information. The image information digitalized by the signal processing unit 202 is subjected to a predetermined image process by the image processing unit 203 controlled by the central processing unit 204. Thereafter, the resultant image information is recorded in the semiconductor memory 205, such as a nonvolatile memory. In this case, the semiconductor memory 205 may be a memory card to be installed in the memory card slot 109, or a semiconductor memory built in the camera main body. The liquid crystal monitor 106 is capable of displaying an image which is being photographed, and any image which is recorded in the semiconductor memory 205. The image recorded in the semiconductor memory 205 is capable of being transmitted to the outside of the camera though the communication card 206 or the like installed in the communication cared slot 110.

While the camera 100 is carried, the photographic lens assembly 101 is put in the collapsed state (see FIG. 2A), and is thus sunk in the body of the camera 100, a shown in FIG. 12A. The camera lens assembly 101 is designed in a way that: once the user manipulates the power supply switch 108, the electric power is supplied; thereby, as shown in FIG. 12B, the lens barrel is extended, and the camera lens assembly 101 is accordingly put in a photographic state with the lens barrel projecting from the body of the camera (see FIG. 12B). In a case where the first lens group 11 and the second lens group 12 constitute the focal length variable zoom lens, the optical systems of the respective lens group constituting the zoom lens are placed, for example, in their wide-angle positions inside the lens barrel 10 of the photographic lens assembly 101. Once the zoom lever 103 is manipulated, the photographic lens assembly 101 can perform power varying operation, which accompanies the movement toward the telephoto end, by changing the placement of the optical systems of the respective lens groups. Incidentally, it is desirable that the optical system of the finder 104 also should vary its power in conjunction with the change in the angle of view of the photographic lens assembly 101.

In many cases, the focusing is performed by half-pressing the shutter release button 102. Once the shutter release button 102 is put into a fully-pressed state by being further pressed, photographing is performed. Thereafter, the processes described above are carried out.

When an image recorded in the semiconductor memory 205 is intended to be displayed on the liquid crystal monitor 106, or to be transmitted to the outside through the communication card 206 or the like, the manipulation button 107 is manipulated in a predetermined manner. Each of the semiconductor memory 205, the communication card 206 and the like is used by being installed in its specialized or general-purpose slot, such as the memory card slot 109 or the communication slot 110.

Next, descriptions will be provided for a technical problem with lens barrels (and image taking apparatuses on which the lens barrels are mounted) each with a configuration in which: multiple movable lens barrels for supporting the respective lens groups are retracted in the inside of the camera main body portion while no photographing is performed; and the movable lens barrels are extended from the inside of the camera main body portion when photographing is performed. The technical problem will be explained by use of the lens barrel 10 for the sake of making the technical problem understood easily, because even the lens barrel 10 (and the camera (image taking apparatus)) 100 would have the same problem if they would not include the ring member 50 or the structure in its vicinity.

If, while in the photographic state, the image taking apparatus (the camera 100), on which the lens barrel 10 is mounted, receives an impact which stems from an external factor such as its fall or a collision by another object, heavy load is likely to be caused on the connecting part (specifically, the cam followers 22a and the cam grooves 21c) between the first rotary barrel 22 and the fixed barrel portion 21a. A reason for this is as follows. For example, if the image taking apparatus (the camera 100) falls with the front end portion of a member (the linear advancement barrel 27 in the case of the lens barrel 10), which is situated in the front end among the extended movable lens barrels, faced downward, an impact force in the direction of the photographic optical axis OA acts mainly due to the weight of the camera main body portion. In the lens barrel 10, the load attributable to the impact force thus acts on the connecting part between the fixed barrel portion 21a fixed to the camera main body portion (specifically, the fixation frame 21) and the first rotary barrel 22, the connecting part between the first rotary barrel 22 and the first liner 23, the connecting part between the first liner 23 and the second rotary barrel 24, as well as the connecting part between the second rotary barrel 24 and the linear advancement barrel 27. It is difficult to secure strength for the connecting part between the fixed barrel portion 21a and the first rotary barrel 21, as opposed to the other connecting parts. The reason for this is that the fixed barrel portion 21a is provided with the linear advancement grooves 21b for the movement of the first liner 23 in addition to the cam grooves 21c for the movement of the first rotary barrel 22. Furthermore, particularly, the configuration which, like in the embodiment, retracts the third lens group 13 and the fourth lens group 14 from their positions on the photographic optical axis OA to the outside of the fixed barrel portion 21a needs to be provided with: notches for the movement of the third lens group 13 and the fourth lens group 14 inside and outside the fixed barrel portion 21a; the mechanisms for driving the third lens group 13 and the fourth lens group 14; and the like.

Moreover, in the lens barrel 10, the cam grooves 21c are provided in the three respective locations in the inner peripheral surface of the fixed barrel portion 21a, and the other components (i.e., the linear advancement grooves 21b and the like) need to be further provided to the inner peripheral surface of the fixed barrel portion 21a. In some case, this makes it difficult to provide the cam grooves 21c to the inner peripheral surface of the fixed barrel portion 21a in a way that makes an equal positional relationship exist among the cam grooves 21c in the circumferential direction of the fixed barrel portion 21a. In this case, the load acting on the connecting part between the fixed barrel portion 21a and the first rotary barrel 22 become uneven in the circumferential direction of the fixed barrel portion 21a. For this reason, it is desirable that the connecting part between the first rotary barrel 22 and the fixed barrel portion 21a should be reinforced in appropriate locations in accordance with the unevenness in the circumferential direction.

To this end, it is conceivable that the load caused on the connecting part between the first rotary barrel 22 and the fixed barrel portion 21a is reduced by use of a configuration in which: revolution-side engagement parts are provided to the first rotary barrel 22; concurrently, fixation-side engagement parts are provided to the fixed barrel portion 21a; and the revolution-side engagement parts and the fixation-side engagement parts are made to engage with each other in the direction of the photographic optical axis OA with the revolution-side engagement parts situated closer to the object, and with the fixation-side engagement parts situated closer to the image surface in the photographic state. However, when the first rotary barrel 22 is retracted, such revolution-side engagement parts need to be situated closer to the image surface, and concurrently such fixation-side engagement parts need to be situated closer to the object, because the first rotary barrel 22 is designed to move in the direction of the photographic optical axis OA with respect to the fixed barrel portion 21a. This requires that the revolution-side engagement parts and the fixation-side engagement parts should pass by each other in the direction of the photographic optical axis OA when the movable lens barrels advance. In addition, it is desirable that such revolution-side engagement parts should be provided to the outer peripheral surface of the base end portion of the first rotary barrel 22, and concurrently that such fixation-side engagement parts should be provided to the inner peripheral surface of the front end portion of the fixed barrel portion 21a, because the thickness dimension of the retracted lens cameral cone 10 (i.e., the size dimension of the retracted lens barrel 10 in the direction of the photographic optical axis OA) is required to be as small as possible. However, a range in which the revolution-side engagement parts can be formed is limited extremely narrowly, because the gear portion 22b (see FIG. 5) is provided to the outer peripheral surface of the base end portion of the first rotary barrel 22. Although it is conceivable that the gear portion 22b is used as the revolution-side engagement parts, a range in which the fixation-side engagement parts can be formed in the inner peripheral surface of the front end portion of the fixed barrel portion 21a is limited extremely narrowly from a viewpoint that the fixation-side engagement parts should be able to pass by the gear portion 22b because the gear portion 22b is provided extending in the wide area in the outer peripheral surface of the base end portion of the first rotary barrel 22 in the circumferential direction.

Particularly in a case where like in the lens barrel 10 of the embodiment, the first rotary barrel 22 and the fixed barrel portion 21a are connected together by use of the cam mechanism including the idle revolving areas, that is to say, in a case where the first rotary barrel 22 is designed not to move in the direction of the photographic optical path OA while revolving with respect to the fixed barrel portion 22 in order to move between the wide-angle position and the telephoto position while in the photographic state, the relationship between the revolution-side engagement parts and the fixation-side engagement parts in terms of their relative positions changes in accordance with the rotary posture of the first rotary barrel 22 with respect to the fixed barrel portion 21a. In some case, therefore, the revolution-side engagement parts and the fixation-side engagement parts cannot be made to engage with each other due to the rotary posture when the range in which the revolution-side engagement parts can be formed and the range in which the fixation-side engagement parts can be formed are limited extremely narrowly. This makes it difficult to appropriately reinforce the connecting part between the first rotary barrel 22 and the fixed barrel portion 21a, that is to say, to effectively reduce the load caused on the connection part between the first rotary barrel 22 and the fixed barrel portion 21a, by use of the configuration in which: the revolution-side engagement parts are provided to the first rotary barrel 22; and concurrently, the fixation-side engagement parts are provided to the fixed barrel portion 21a.

In contrast to this, the lens barrel 10 of the present embodiment makes the protrusions 51 and the engagement sections 64 engage with each other when the first rotary barrel 22 is to move toward the image surface (in the direction in which the lens barrel 10 is retracted) with respect to the fixed barrel portion 21, because the protrusions 51 of the ring member 50 is respectively opposed to the engagement sections 64 in the revolution guide groove sections 63 of the protrusion guide grooves 61 in the direction of the photographic optical axis OA once the cam followers 22a become situated between the vicinities (see reference sign 22a2 in FIG. 6) of the open ends (i.e., the joint positions between the revolution groove parts and the advancement/retreat groove parts) and the extension ends (see reference sign 22a1 in FIG. 6) of the revolution groove parts of the cam grooves 21c, that is to say, once the lens barrel 10 is put into the photographic state.

Furthermore, the lens barrel 10 fixes the engagement positions between the protrusions 51 and the engagement sections 64 in the circumferential direction of the fixed barrel portion 21a regardless of the rotary posture of the first rotary barrel 22 with respect to the fixed barrel portion 21a, because the ring member 50 keeps the engagement-enabling positions even though the first rotary barrel 22 is made to revolve with respect to the fixed barrel portion 21a while in the photographic state.

Thereby, while in the photographic state, the lens barrel 10 of the present invention makes the protrusions 51 and the engagement sections 64 engage with each other when the first rotary barrel 22 is to move toward the image surface (in the direction in which the lens barrel 10 is retracted) with respect the fixed barrel portion 21a. For this reason, the lens barrel 10 can make the engagement take over part of the load caused on the first rotary barrel 22 and the first liner 23, and accordingly can reduce the load which is caused on the connecting part between the first rotary barrel 22 and the fixed barrel portion 21a.

In addition, the lens barrel 10 is capable of fixing the engagement positions between the protrusions 51 and the engagement sections 64 in the circumferential direction of the fixed barrel portion 21a regardless of the rotary posture of the first rotary barrel 22 with respect to the fixed barrel portion 21a. For this reason, when the engagement positions are set up appropriately, the lens barrel 10 can efficiently reduce the load which is caused on the connecting part between the first rotary barrel 22 and the fixed barrel portion 21a.

Furthermore, the lens barrel 10 no longer need be provided with a new drive source other than the drive source for the movable lens barrel in order to reinforce the connecting part between the first rotary barrel 22 and the fixed barrel portion 21a, because the use of the magnetic attraction between the attracting portion 53 and the attracted portion 52 enables the rotary posture of the ring member 50 to be changed between the engagement-enabling portion and the release position in accordance with the rotary posture of the first rotary barrel 22 with respect to the fixed barrel portion 21a.

The lens barrel 10 makes it possible to set up the engagement positions between the protrusions 51 and the engagement sections 64 at desired positions in the fixed barrel portion 21 in the circumferential direction, because the lens barrel 10 no longer need to use a drive source for the retractable frame which is dedicated for the retractable lens holding frame. For this reason, the lens barrel 10 makes it possible to effectively reinforce positions corresponding respectively to the locations in which the connecting position between the first rotary barrel 22 and the fixed barrel portion 21a is provided.

The lens barrel 10 is capable of transmitting the movement force produced by the movement of the first rotary barrel 22 toward the image surface in the direction of the photographic optical axis OA to the full range of the ring member 50 in the circumferential direction, because the ring member 50 is put in contact with the rear end surface of the first rotary barrel 22. Accordingly, the lens barrel 10 can prevent the strength from becoming uneven in the direction of the revolution around the photographic optical axis OA.

The lens barrel 10 has the configuration in which the ring member 50 is placed between the flange portion 23f of the first liner 23 and the rear end surface of the first rotary barrel 22. For this reason, using the simple configuration, the lens barrel 10 makes the ring member 50 capable of revolving around the photographic optical axis OA with the first liner 23 and the first rotary barrel 22, and enables the ring member 50 to follow the position in the direction of the photographic optical axis OA.

While in the photographic state, the lens barrel 10 prevents the revolution of the ring member 50 by bringing the protrusions 51 in contact with the respective revolution restriction sections 65 in the protrusion guide groove sections 63, and thereby can undo the positional relationship which enables the attracting portion 53 and the attracted portion 52 to exert their magnetic attraction (i.e., the state in which the attracting portion 53 and the attracted portion 52 are opposed to each other). For this reason, using the simple configuration, the lens barrel 10 can determine whether or not the rotary force of the first rotary barrel 22 should be transmitted to the ring member 50 through the rotary force transmitting unit, depending on the rotary posture of the first rotary barrel 22.

In the lens barrel 10, the engagement sections 64 are made from parts of the revolution guide groove sections 63, and the linear advancement guide groove sections 62 continue to the open ends of the revolution guide groove sections 63, respectively. For this reason, using the simple configuration, the lens barrel 10 can make the protrusions 51 of the ring member 50 engage with the respective engagement sections 64 in accordance with the rotary posture of the first rotary barrel 22, and concurrently can prevent the protrusions 51 from hindering the advancement and retreat of the first rotary barrel 22 with respect to the fixed barrel portion 21a.

In the lens barrel 10, the three protrusions 51 are provided to the ring member 50, and the three engagement sections 64 are provided to the inner peripheral surface of the fixed barrel portion 21a. For this reason, the lens barrel 10 can divide part of the load caused on the first rotary barrel 22 and the first liner 23 into three portions, and thereby can make the groups each consisting of one protrusion 51 and one engagement section 64 take over the three respective portions. Accordingly, the lens barrel 10 can more effectively reduce the load caused on the connecting part between the first rotary barrel 22 and the fixed barrel portion 21a.

In the lens barrel 10, one engagement section 64 with which to engage a corresponding one of the protrusions 51 of the ring member 50 is situated between each neighboring two of the revolution groove parts of the cam grooves 21c provided in the three locations in the inner peripheral surface of the fixed barrel portion 21a. For this reason, the lens barrel 10 can make the load, which is caused on the first rotary barrel 22 and the first liner 23, taken over by the middle positions of the engagement areas between the cam followers 22a and the cam grooves 21c, which constitute the connecting part between the first rotary barrel 22 and the fixed barrel portion 21a, respectively. Accordingly, the lens barrel 10 can more effectively reduce the load which is caused on the connecting part between the first rotary barrel 22 and the fixed barrel portion 21a.

The lens barrel 10 makes the protrusions 51 of the ring member 50 and the engagement sections 64 of the fixed barrel portion 21a capable of coming in contact with each other in a plane orthogonal to the photographic optical axis OA. For this reason, the lens barrel 10 can makes the part of the load, which is caused on the first rotary barrel 22 and the first liner 23, adequately taken over by their contact.

In the lens barrel 10, the three protrusions 51 of the ring member 50 and the three engagement sections 64 in the inner peripheral surface of the fixed barrel portion 21 are set up in the equal intervals in the circumferential direction. For this reason, the lens barrel 10 can divide part of the load caused on the first rotary barrel 22 and the first liner 23 into three equal portions, and thereby can make the groups each consisting of one protrusion 51 and one engagement section 64 take over the three respective equal portions. Accordingly, the lens barrel 10 can more effectively and more evenly reduce the load which is caused on the connecting part between the first rotary barrel 22 and the fixed barrel portion 21a.

In the lens barrel 10, the linear advancement guide groove sections 62 of the protrusion guide grooves 61 are inclined in the same direction as are the advancement/retreat groove parts (the parts which incline to the photographic optical axis OA) of the cam grooves 21c with respect to the direction of the photographic optical axis OA. For this reason, the lens barrel 10 can make the direction of the revolution of the first rotary barrel 22 with respect to the fixed barrel portion 21a and the direction of the revolution of the ring member 50 coincide with each other. Accordingly, the lens barrel 10 can make the advancement and retreat movements of the first rotary barrel 22 and the ring member 50 smoother, and concurrently can make the revolution of the ring member 50 smoother.

In the lens barrel 10, the inclination angles of the linear advancement guide groove sections 62 of the protrusion guide grooves 61 to the photographic optical axis OA is set smaller than the inclination angles of the advancement/retreat groove parts (the parts which incline to the photographic optical axis OA) of the cam grooves 21c, and the ring member 50 is designed to be capable of revolving with respect to the first rotary barrel 22. For this reason, the lens barrel 10 can reduce areas occupied by the respective protrusion guide grooves 61 in the inner peripheral surface of the fixed barrel portion 21a in the circumferential direction. Accordingly, the lens barrel 10 can improve the strength of the fixed barrel portion 21a. This is because in general, the linear advancement guide groove sections 62 and the advancement/retreat groove parts of the cam grooves 21c are considered to be set up in parallel with each other on the basis of the configuration in which the linear advancement guide sections 62 of the protrusion guide grooves 61 enables the protrusions 51 to move in the direction of the photographic optical axis OA in order to enable the advancement and retreat movement of the ring member 50.

In the lens barrel 10, the inclination angles of the linear advancement guide groove sections 62 of the protrusion guide grooves 61 to the photographic optical axis OA is set smaller than the inclination angles of the advancement/retreat groove parts (the parts which incline to the photographic optical axis OA) of the cam grooves 21c, and the ring member 50 is designed to be capable of revolving with respect to the first rotary barrel 22. For this reason, the lens barrel 10 can make the positional relationship between the attracting portion 53 of the first rotary barrel 22 and the attracted portion 52 of the ring member 50 become different in the circumferential direction, that is to say, the lens barrel 10 can undo the relationship which make the attracting portion 53 and the attracted portion 52 opposed to each other in the direction of the photographic optical axis OA, when the first rotary barrel 22 is made to revolve in the direction in which the first rotary barrel 22 is retracted from its retraction starting position into the fixed barrel portion 21a. Accordingly, the lens barrel 10 can inhibit the rotary force of the first rotary barrel 22 from being transmitted to the ring member 50 by use of the magnetic attraction between the attracting portion 53 and the attracted portion 52 on any occasion, except when the rotary force produced by the revolution of the first rotary barrel 22 with respect to the fixed barrel portion 21a needs to be used (i.e., when the protrusions 51 of the ring member 50 are made to move within the revolution guide groove sections 63 of the protrusion guide grooves 61).

In the lens barrel 10, the ring member 50 is formed from the nonmagnetic metal material. For this reason, the lens barrel 10 can obtain the improved strength by use of the small structure while enabling the attracting portion 53 and the attracted portion 52 to exert their magnetic attraction only when the first rotary barrel 22 takes the desired rotary posture.

In the lens barrel 10, the attracted portion 52 of the ring member 50 serving as a part of the rotary force transmitting unit is formed from the plate-shaped member of the soft magnetic material. For this reason, the lens barrel 10 can prevent the attracted portion 52 from being put into the state of being magnetized by the attracting portion 53. Accordingly, the operation of the lens barrel 10 can be securely prevented from being hindered by an effect which the attracted portion 52 would otherwise have on members around the attracted portion 52.

In the lens barrel 10, the ring member 50 is in contact with the rear end surface of the first rotary barrel 22, and the protrusion guide grooves 61 which form the engagement sections 64 while capable of movably accepting the protrusions 51 of the ring member 50 are in the inner peripheral wall surface of the fixed barrel portion 21a. For this reason, the lens barrel 10 can prevent the increase in the thickness dimension of the fixed barrel portion 21a.

In the lens barrel 10, the linear advancement guide groove sections 62 of the protrusions 61 serve the purpose if the liner advancement guide groove sections 62 enable the protrusions 51 of the ring member 50 to move in the direction of the photographic optical axis OA. For this reason, the inclination of the liner advancement guide groove sections 62 to the photographic optical axis OA can be set up freely as long as the inclination includes a component of the photographic optical axis OA. Accordingly, the lens barrel 10 can increase the latitude in designing the fixed barrel portion 21a.

In the lens barrel 10, the rotary force transmitting unit for transmitting the rotary force of the first rotary barrel 22 to the ring member 50 is made up from only the single attracted portion 52 and the single attracted portion 53. Accordingly, the lens barrel 10 makes it possible to make the structure smaller.

In the lens barrel 10, the spaces are made between the protrusions 51 and the corresponding engagement sections 64 while the protrusions 51 and the engagement sections 64 are put in the state of being situated in the engagement-enabling positions. Accordingly, while in the photographic state, the lens barrel 10 can prevent the engagement of the protrusions 51 and the corresponding engagement sections 64 from adversely affecting the locations of the lens grooves in the direction of the photographic optical axis OA.

The lens barrel 10 enables the ring member 50 to be formed only by providing the ring member 50 with the protrusions 51 which are formed projecting outward in the respective radial directions; and attaching the attracted portion 52 to the rear surface of the ring member 50. Accordingly, the lens barrel 10 makes it possible to simplify the shape and structure of the ring member 50.

While in the photographic state, the camera 100 (the image taking apparatus) on which the lens barrel 10 is mounted can have an improved durability of the lens barrel 10 against an impact which stems from an external factor such as its fall or a collision by another object.

In sum, the lens barrel 10 of the present invention enables the connecting part between the fixed barrel portion 21a and the first rotary barrel 22 to be appropriately reinforced without requiring a new drive source.

Although the lens barrel 10 is described in the embodiments as an example of a lens barrel according to the present invention, the lens barrel is not limited to that in the embodiment and may be of any lens barrel as long as it is a lens barrel including: a plurality of lens holding frames configured to respectively hold a plurality of lens groups in order that the lens groups be changed from a collapsed state to a photographic state by moving the at least some of the lens groups toward an object, the collapsed state being that in which the lens groups are stored with at least some of the plurality of lens groups retracted; a movable lens barrel configured to hold the lens holding frames in its inside; and a fixed barrel portion configured to hold the movable lens barrel in its inside, the movable lens barrel including a rotary barrel fitted in the fixed barrel portion in a way that makes the rotary barrel movable in a direction of a photographic optical axis with respect to the fixed barrel portion, and revolvable around the photographic optical axis, the lens barrel including: a cam mechanism connecting the rotary barrel and the fixed barrel portion together and having an advancement/retreat movement area and an idle revolving area, the advancement/retreat movement area being configured to make the rotary barrel, which has been in the collapsed state, advance in the direction of the photographic optical axis in response to revolution of the rotary barrel with respect to the fixed barrel portion, the idle revolving area continuing to the advancement/retreat movement area, and the idle revolving area being configured to allow the rotary barrel to revolve with respect to the fixed barrel portion without moving the rotary barrel in the direction of the photographic optical axis while in the photographic state; and a ring member capable of revolving with respect to the fixed barrel portion, concurrently capable of moving in the direction of the photographic optical axis integrally with the rotary barrel, and shaped like a ring which enables the ring member to be accommodated in an inside of the fixed barrel portion, in which the ring member includes at least one protrusion which projects in a radial direction, the fixed barrel portion includes an engagement section and a rotary drive mechanism, the protrusion being capable of engaging with the engagement section in the direction of the photographic optical axis from near the object, the rotary drive mechanism being configured to make the ring member revolve with respect to the fixed barrel portion in response to the revolution of the rotary barrel with respect to the fixed barrel portion, the rotary drive mechanism makes the ring member assume its rotary posture with respect to the fixed barrel portion in an engagement-enabling position which makes the protrusion and the engagement section opposed to each other in the direction of the photographic optical axis with the protrusion being situated closer to the object, when the connection by the cam mechanism becomes situated in a predetermined position which directs the connection from a first end to a second end of the idle revolving area, the first end continuing to the advancement/retreat movement area, the rotary drive mechanism makes the ring member assume its rotary posture in a release position which releases the engagement section and the protrusion from their opposed state in the direction of the photographic optical axis, when the connection by the cam mechanism becomes situated in a location of the first end of the idle revolving area, and the rotary drive mechanism makes the ring member keep its rotary posture in the engagement-enabling position, when the connection by the cam mechanism becomes situated in a position between the predetermined position and the second end.

Furthermore, although in the foregoing embodiment, the rotary force transmitting unit is formed from the attracting portion 53 and the attracted portion 52, the rotary force transmitting unit is not limited to that of the embodiment. The rotary force transmitting unit may be, for example, one which uses the resistance between the protrusions 51 of the ring member 50 and the wall surfaces of the revolution guide groove sections 63 of the protrusion guide grooves 61, as long as such rotary force transmitting unit enables the rotary force, which is produced by the revolution of the first rotary barrel 22 with respect to the fixed barrel portion 21a, to be transmitted to the ring member 50.

Moreover, although in the foregoing embodiment, the linear advancement guide groove sections 62 of the protrusion guide grooves 61 are inclined to the photographic optical axis OA, the linear advancement guide groove sections 62 are not limited to those of the embodiment. The liner advancement guide groove sections 62 may be those which extend along the photographic optical axis OA, as long as the linear advancement guide groove sections 62 include the component of the photographic optical axis OA.

Although in the foregoing embodiment, the ring member 50 is provided with the single attracted portion 52, the ring member 50 is not limited to that of the embodiment. The ring member 50 may be provided with multiple attracted portions 52. When the ring member 50 is provided with the multiple attracted portions 52, the ring member 50 can be made to revolve smoothly.

(Effects of the Invention)

During the photographic state, when the rotary barrel is to move toward the image surface (in the direction in which the rotary barrel is retracted) with respect to the fixed barrel portion, the lens barrel of the present invention can reduce the load caused on the connecting part between the rotary barrel and the fixed barrel portion, because the protrusions engage with the engagement sections.

In addition, the lens barrel of the present invention makes it possible to reinforce the connecting part between the rotary barrel and the fixed barrel portion without being provided with a new different power supply source, because the lens barrel is capable of making the rotary posture of the ring member different between the engagement-enabling position and the release position in accordance with the rotary posture of the rotary barrel with respect to the fixed barrel portion.

Furthermore, the lens barrel of the present invention makes it possible to effectively reinforce an area corresponding to the location in which the connecting part between the movable lens barrel and the fixed barrel portion is provided, because no use of the drive source for the retractable frame which is dedicated for the retractable lens holding frames enables the positions in which the protrusions engage with the respective engagement sections to be set in desirable positions in the fixed barrel portion in the circumferential direction.

In addition to the above-described configuration, the movable lens barrel may include a linear advancement guide barrel which is revolvable with respect to the rotary barrel, concurrently movable integrally with the rotary barrel in the direction of the photographic optical axis with respect to the fixed barrel portion, and capable of being fitted in the rotary barrel, and the ring member may be provided between the linear advancement guide barrel and the rotary barrel in the direction of the photographic optical axis in a way that makes the ring member revolvable with respect to the linear advancement guide barrel. With this configuration, the lens barrel of the present invention enables the movable lens barrel to revolve around the photographic optical axis with respect to the linear advancement guide barrel and the rotary barrel, and concurrently to follow their positions in the direction of the photographic optical axis, by employing the simple structure.

Moreover, the lens barrel of the present invention can prevent the occurrence of the unevenness of the strength in the direction of the revolution around the photographic optical axis, because the contact of the ring member to the rear end surface of the rotary barrel enables the movement force, which is produced by the movement of the rotary barrel toward the image surface in the direction of the photographic optical axis, to be transmitted to the whole area of the ring member in the circumferential direction.

In addition to the above-described configuration, the rotary drive mechanism may include a long-sized protrusion guide groove which is provided, and forms the engagement section, in an inner peripheral wall surface of the fixed barrel portion in a way that makes the protrusion guide groove capable of movably accepting the protrusion. With this configuration, the lens barrel of the present invention can make the protrusions of the ring member engage with the respective engagement sections in accordance with the rotary posture of the rotary barrel by employing the simple structure.

In addition to the above-described configuration, the rotary drive mechanism may include a rotary force transmitting unit capable of transmitting rotary force, which is produced by the revolution of the rotary barrel with respect to the fixed barrel portion, to the ring member; one lengthwise end portion of the protrusion guide groove may constitute a revolution guide groove section, and the remaining lengthwise end portion of the protrusion guide groove may constitute a linear advancement guide groove section, the revolution guide groove section extending in a direction of the revolution of the ring member with respect to the fixed barrel portion, the direction coinciding with a direction in which the connection by the cam mechanism is shifted from the first end to the second end in a direction of the revolution of the rotary barrel with respect to the fixed barrel portion, the linear advancement guide groove section continuing the revolution guide groove section and extending in a direction which includes the direction of the photographic optical axis; and the rotary drive mechanism may make the protrusion situated in the linear advancement guide groove section, when the connection by the cam mechanism becomes situated in the advancement/retreat movement area, the rotary mechanism may make the protrusion situated in the revolution guide groove section, and concurrently enables the rotary force of the ring member to be transmitted by the rotary force transmitting unit, when the connection by the cam mechanism becomes situated in a position which makes the connection shift from the location of the first end of the idle revolving area to the predetermined position, and the rotary mechanism may enable the rotary force to be transmitted by the rotary force transmitting unit to the ring member which makes the protrusion situated in the revolution guide groove section, when the connection by the cam mechanism becomes situated in a position which makes the connection shift from the predetermined position to the location of the first end in the idle revolving area. With this configuration, the lens barrel of the present invention can make the protrusions of the ring member engage with the respective engagement sections in accordance with the rotary posture of the rotary barrel, and concurrently can prevent the protrusions from hindering the advancement and retreat of the rotary barrel with respect to the fixed barrel portion, by employing the simple structure.

In addition to the above-described configuration, the rotary force transmitting unit may include an attracting portion made from a magnet and an attracted portion made from a soft magnetic material, the attracting portion being provided to one of the rotary barrel and the ring member in a predetermined range in the direction of the revolution, the attracted portion being provided to the other of the rotary barrel and the ring member in a predetermined range in the direction of the revolution, the revolution guide groove section may form a revolution restriction section: which forms the engagement section on a plane orthogonal to the photographic optical axis; and which comes into contact with the protrusion in the direction of the revolution of the ring member in order to keep the engagement-enabling position in a closed end which is opposite from an opened end continuing to the linear advancement guide groove section, and the rotary drive mechanism may have a positional relationship: which enables the rotary force produced by the revolution of the rotary barrel with respect to the fixed barrel portion to be transmitted to the ring member by making the attracting portion and the attracted portion opposed to each other in the direction of the photographic optical axis, when the connection by the cam mechanism becomes situated in a location of the idle revolving area; and which brings the protrusion and the revolution restriction section into contact with each other in the revolution guide groove section by use of the revolution of the ring member, to which the rotary force is transmitted, with respect to the fixed barrel portion, when the connection by the cam mechanism becomes situated in the predetermined position in the idle revolving area. With this configuration, the lens barrel of the present invention makes it possible to construct the rotary force transmitting unit by employing the simple structure, because the use of the magnetic attraction between the attracting portion and the attracted portion enables the rotary posture of the ring member to become different between the engagement-enabling position and the release position in accordance with the rotary posture of the rotary barrel with respect to the fixed barrel portion.

In addition, during the photographic state, the lens barrel of the present invention can undo the positional relationship which enables the attracting portion and the attracted portion to exert their magnetic attraction (i.e., the state in which the attracting portion and the attracted portion are opposed to each other) by employing the simple structure, and accordingly determines whether or not the rotary force of the rotary barrel should be transmitted to the ring member through the rotary force transmitting unit depending on the rotary posture of the rotary barrel, because the lens barrel can prevent the revolution of the ring member by bringing the protrusions in contact with the revolution restriction sections in the revolution guide groove sections.

Additionally, the lens barrels can securely prevent the operation of the lens barrel from being hindered by effect of the magnetic attraction which would otherwise be on the peripheral members, because the forming of the attracted portion of the rotary force transmitting unit from the soft magnetic material can prevent the attracted portion from being put into a magnetized state by the attracting portion made of the magnet.

Besides, the lens barrel can make part of the load caused on the rotary barrel more appropriately taken over by the protrusions of the ring member and the engagement sections of the fixed barrel portion, because the protrusions can engage with the engagement sections in the plane orthogonal to the photographic optical axis.

In addition to the above-described configuration, the cam mechanism may include a cam follower provided to the rotary barrel, the cam follower projecting in a radial direction of the rotary barrel, and a cam groove provided in the inner peripheral wall surface of the fixed barrel portion in a way that makes the cam groove capable of engaging with the cam follower, the cam groove may include an advancement/retreat groove part and a revolution groove part, the advancement/retreat groove part being inclined with respect to the direction of the revolution of the rotary barrel with respect to the fixed barrel portion and the direction of the photographic optical axis for forming the advancement/retreat movement area, the revolution groove part extending along a plane orthogonal to the direction of the photographic optical axis for forming the idle revolving area, and the linear advancement guide groove section of the protrusion guide groove may have an inclination which is less than that of the advancement/retreat groove part of the cam groove to the direction of the photographic optical axis. With this configuration, the lens barrel makes it possible to improve the strength of the fixed barrel portion, because the area occupied by the protrusion guide grooves in the inner peripheral surface of the fixed barrel portion in the circumferential direction can be reduced.

In addition to the above-described configuration, both the engagement section and the protrusion may be provided in more than three locations at equal intervals in the direction of the revolution of the ring member with respect to the fixed barrel portion. With this configuration, the lens barrel can make the part of the load, which is caused on the rotary barrel, taken over by three portions equally and can more effectively and more evenly reduce the load which is caused on the connecting part between the rotary barrel and the fixed barrel portion.

In addition to the above-described configuration, while in the photographic state, the rotary drive mechanism may fix the rotary posture of the ring member with respect to the fixed barrel portion in the engagement-enabling position. With this configuration, by appropriately setting the engagement position between the protrusion and the engagement section in the circumferential direction of the fixed barrel portion, the lens barrel can efficiently reduce load which is caused on the connecting part between the rotary barrel and the barrel portion.

In addition to the above-described configuration, the ring member may be made from a nonmagnetic metal material. With this configuration, the lens barrel can obtain the improved strength by use of the small structure while enabling the magnet and the soft magnetic material to exert their magnetic attraction only when the rotary barrel takes the desired rotary posture.

In addition to the above-described configuration, while in the photographic state, the movable lens barrel may make its focal length variable by changing a relationship among the lens groups in term of their relative positions in the direction of the photographic optical axis. With this configuration, the lens barrel makes it possible to appropriately reinforce the connecting part between the movable lens barrel (rotary barrel) and the fixed barrel portion regardless of the change in the focal length.

Although the foregoing descriptions have been provided for the image taking apparatus on the basis of the embodiment, any specific configurations are not limited to those in the embodiment. Changes, additions and the like can be made to the design within the scope not departing from the gist of the present invention.

What is claimed is:

1. A lens barrel including:
a plurality of lens holding frames configured to respectively hold a plurality of lens groups in order that the lens groups be changed from a collapsed state to a photographic state by moving the at least some of the lens groups toward an object, the collapsed state being that in which the lens groups are stored with at least some of the plurality of lens groups retracted;
a movable lens barrel configured to hold the lens holding frames in its inside; and
a fixed barrel portion configured to hold the movable lens barrel in its inside,
the movable lens barrel including a rotary barrel fitted in the fixed barrel portion in a way that makes the rotary barrel movable in a direction of a photographic optical axis with respect to the fixed barrel portion, and revolvable around the photographic optical axis,
the lens barrel comprising:
a cam mechanism connecting the rotary barrel and the fixed barrel portion together and having an advancement/retreat movement area and an idle revolving area, the advancement/retreat movement area being configured to make the rotary barrel, which has been in the collapsed state, advance in the direction of the photographic optical axis in response to revolution of the rotary barrel with respect to the fixed barrel portion, the idle revolving area continuing to the advancement/retreat movement area, and the idle revolving area being configured to allow the rotary barrel to revolve with respect to the fixed barrel portion without moving the rotary barrel in the direction of the photographic optical axis while in the photographic state; and
a ring member capable of revolving with respect to the fixed barrel portion, concurrently capable of moving in the direction of the photographic optical axis integrally with the rotary barrel, and shaped like a ring which enables the ring member to be accommodated in an inside of the fixed barrel portion, wherein
the ring member includes at least one protrusion which projects in a radial direction,
the fixed barrel portion includes an engagement section and a rotary drive mechanism, the protrusion being capable of engaging with the engagement section in the direction of the photographic optical axis from near the object, the rotary drive mechanism being configured to make the ring member revolve with respect to the fixed barrel portion in response to the revolution of the rotary barrel with respect to the fixed barrel portion,
the rotary drive mechanism makes the ring member assume its rotary posture with respect to the fixed barrel portion in an engagement-enabling position which makes the protrusion and the engagement section opposed to each other in the direction of the photographic optical axis with the protrusion being situated closer to the object, when the connection by the cam mechanism becomes situated in a predetermined position which directs the connection from a first end to a second end of the idle revolving area, the first end continuing to the advancement/retreat movement area,
the rotary drive mechanism makes the ring member assume its rotary posture in a release position which releases the engagement section and the protrusion from their opposed state in the direction of the photographic optical axis, when the connection by the cam mechanism becomes situated in a location of the first end of the idle revolving area, and
the rotary drive mechanism makes the ring member keep its rotary posture in the engagement-enabling position, when the connection by the cam mechanism becomes situated in a position between the predetermined position and the second end.

2. The lens barrel according to claim 1, wherein
the movable lens barrel includes a linear advancement guide barrel which is revolvable with respect to the rotary barrel, concurrently movable integrally with the rotary barrel in the direction of the photographic optical axis with respect to the fixed barrel portion, and capable of being fitted in the rotary barrel, and
the ring member is provided between the linear advancement guide barrel and the rotary barrel in the direction of the photographic optical axis in a way that makes the ring member revolvable with respect to the linear advancement guide barrel.

3. The lens barrel according to claim 1, wherein
the rotary drive mechanism includes a long-sized protrusion guide groove which is provided, and forms the engagement section, in an inner peripheral wall surface of the fixed barrel portion in a way that makes the protrusion guide groove capable of movably accepting the protrusion.

4. The lens barrel according to claim 3, wherein:
the rotary drive mechanism includes a rotary force transmitting unit capable of transmitting rotary force, which is produced by the revolution of the rotary barrel with respect to the fixed barrel portion, to the ring member;
one lengthwise end portion of the protrusion guide groove constitutes a revolution guide groove section, and the remaining lengthwise end portion of the protrusion guide groove constitutes a linear advancement guide groove section, the revolution guide groove section extending in a direction of the revolution of the ring member with respect to the fixed barrel portion, the direction coinciding with a direction in which the connection by the cam mechanism is shifted from the first end to the second end in a direction of the revolution of the rotary barrel with respect to the fixed barrel portion, the linear advancement guide groove section continuing the revolution guide groove section and extending in a direction which includes the direction of the photographic optical axis; and
the rotary drive mechanism makes the protrusion situated in the linear advancement guide groove section, when the connection by the cam mechanism becomes situated in the advancement/retreat movement area,
the rotary mechanism makes the protrusion situated in the revolution guide groove section, and concurrently enables the rotary force of the ring member to be transmitted by the rotary force transmitting unit, when the connection by the cam mechanism becomes situated in a position which makes the connection shift from the location of the first end of the idle revolving area to the predetermined position, and the rotary mechanism enables the rotary force to be transmitted by the rotary force transmitting unit to the ring member which makes the protrusion situated in the revolution guide groove section, when the connection by the cam mechanism becomes situated in a position which makes the connection shift from the predetermined position to the location of the first end in the idle revolving area.

5. The lens barrel according to claim 4, wherein
the rotary force transmitting unit includes an attracting portion made from a magnet and an attracted portion made from a soft magnetic material, the attracting portion being provided to one of the rotary barrel and the ring member in a predetermined range in the direction of the revolution, the attracted portion being provided to the other of the rotary barrel and the ring member in a predetermined range in the direction of the revolution, the revolution guide groove section forms a revolution restriction section: which forms the engagement section on a plane orthogonal to the photographic optical axis; and which comes into contact with the protrusion in the direction of the revolution of the ring member in order to keep the engagement-enabling position in a closed end which is opposite from an opened end continuing to the linear advancement guide groove section, and the rotary drive mechanism has a positional relationship: which enables the rotary force produced by the revolution of the rotary barrel with respect to the fixed barrel portion to be transmitted to the ring member by making the attracting portion and the attracted portion opposed to each other in the direction of the photographic optical axis, when the connection by the cam mechanism becomes situated in a location of the idle revolving area; and which brings the protrusion and the revolution restriction section into contact with each other in the revolution guide groove section by use of the revolution of the ring member, to which the rotary force is transmitted, with respect to the fixed barrel portion, when the connection by the cam mechanism becomes situated in the predetermined position in the idle revolving area.

6. The lens barrel according to claim 4, wherein
the cam mechanism includes a cam follower provided to the rotary barrel, the cam follower projecting in a radial direction of the rotary barrel, and a cam groove provided in the inner peripheral wall surface of the fixed barrel portion in a way that makes the cam groove capable of engaging with the cam follower, the cam groove includes an advancement/retreat groove part and a revolution groove part, the advancement/retreat groove part being inclined with respect to the direction of the revolution of the rotary barrel with respect to the fixed barrel portion and the direction of the photographic optical axis for forming the advancement/retreat movement area, the revolution groove part extending along a plane orthogonal to the direction of the photographic optical axis for forming the idle revolving area, and the linear advancement guide groove section of the protrusion guide groove has an inclination which is less than that of the advancement/retreat groove part of the cam groove to the direction of the photographic optical axis.

7. The lens barrel according to claim 1, wherein
both the engagement section and the protrusion are provided in more than three locations at equal intervals in the direction of the revolution of the ring member with respect to the fixed barrel portion.

8. The lens barrel according to claim 1, wherein
while in the photographic state, the rotary drive mechanism fixes the rotary posture of the ring member with respect to the fixed barrel portion in the engagement-enabling position.

9. The lens barrel according to claim 1, wherein
the ring member is made from a nonmagnetic metal material.

10. The lens barrel according to claim 1, wherein
while in the photographic state, the movable lens barrel makes its focal length variable by changing a relationship among the lens groups in term of their relative positions in the direction of the photographic optical axis.

11. An image taking apparatus comprising the lens barrel according to claim 1.

12. A digital camera comprising the lens barrel according to claim 1.

13. A mobile information terminal device comprising the lens barrel according to claim 1.

14. An image inputting apparatus comprising the lens barrel according to claim 1.

* * * * *